US012227010B2

(12) United States Patent
Ishii et al.

(10) Patent No.: US 12,227,010 B2
(45) Date of Patent: Feb. 18, 2025

(54) PRINTING APPARATUS AND MAINTENANCE METHOD

(71) Applicant: CANON KABUSHIKI KAISHA, Tokyo (JP)

(72) Inventors: Yosuke Ishii, Kanagawa (JP); Rie Takekoshi, Kanagawa (JP); Keita Ishimi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/696,559

(22) Filed: Mar. 16, 2022

(65) Prior Publication Data

US 2022/0305792 A1 Sep. 29, 2022

(30) Foreign Application Priority Data

Mar. 24, 2021 (JP) ................................ 2021-050257

(51) Int. Cl.
*B41J 2/165* (2006.01)

(52) U.S. Cl.
CPC ....... *B41J 2/16535* (2013.01); *B41J 2/16526* (2013.01); *B41J 2/16552* (2013.01); *B41J 2002/1655* (2013.01)

(58) Field of Classification Search
None
See application file for complete search history.

(56) References Cited

U.S. PATENT DOCUMENTS

| | | | | |
|---|---|---|---|---|
| 7,287,825 B2 | 10/2007 | Furuichi et al. | ................ | 347/24 |
| 7,290,858 B2 | 11/2007 | Furuichi et al. | ................ | 347/43 |
| 8,342,638 B2 | 1/2013 | Sole Pons et al. | ............. | 347/33 |
| 2008/0238984 A1* | 10/2008 | Yahiro | ................ | B41J 2/14233 347/28 |
| 2013/0257980 A1* | 10/2013 | Ibe | ...................... | B41J 2/16535 347/35 |
| 2014/0035996 A1* | 2/2014 | Gros Gras | ............. | B41J 2/1721 347/33 |

OTHER PUBLICATIONS

U.S. Appl. No. 17/829,651, filed Jun. 1, 2022.
U.S. Appl. No. 17/710,844, filed Mar. 31, 2022.

* cited by examiner

*Primary Examiner* — Alejandro Valencia
(74) *Attorney, Agent, or Firm* — Venable LLP

(57) ABSTRACT

A technique for suppressing ejection failure at an ejection port, which is caused by reaction of reaction liquid and ink during a wiping operation, is to be provided. Before the ejection port surface, on which the first ejection port array that is capable of ejecting the ink and the second ejection port array that is capable of ejecting the reaction liquid which reacts with the ink are formed, is wiped by the maintenance unit that is capable of receiving the ink and the reaction liquid, ink that does not contribute to printing is ejected to an area of the maintenance unit between an area abutted by the first ejection port array during the wiping and an area abutted by the second ejection port array during the wiping.

14 Claims, 22 Drawing Sheets

| TEMPERATURE T | T≦30°C | 30°C<T≦40°C | 40°C<T≦50°C | 50°C<T≦60°C | 60°C<T |
|---|---|---|---|---|---|
| COEFFICIENT | 1 | 1.1 | 1.2 | 1.3 | 1.4 |

FIG.19

| DRIVING RATIO D | D<0.5 | 0.5≦D |
|---|---|---|
| NUMBER OF WIPING TIMES | 1 | 2 |
| COEFFICIENT | 1 | 2 |

FIG.22

PRINTING APPARATUS AND MAINTENANCE METHOD

BACKGROUND OF THE INVENTION

Field of the Invention

The present invention relates to a printing apparatus that wipes an ejection port surface, on which an ejection port of a print head that ejects ink to a print medium is formed, and a maintenance method that favorably maintains and recovers an ejection state of ink from the print head.

Description of the Related Art

U.S. Pat. No. 8,342,638 discloses a technique for removing deposits such as ink adhering to an ejection port surface of a print head in which an ejection port for ejecting ink is formed. Specifically, a sheet-shaped cleaning member is pressed against the ejection port surface to wipe off the deposits adhering to the ejection port surface. Note that the deposits include adhered mist due to bouncing or an ink pool at an ejection port at the time of ink ejection, dust in the atmosphere, fibers derived from a print medium, and the like.

In the technique disclosed in U.S. Pat. No. 8,342,638, since the ejection port surface is wiped by the cleaning member, the cleaning member abuts on the meniscus surface of each ejection port. Therefore, the ink inside the ejection port seeps out to the cleaning member. In particular, in a printing apparatus capable of ejecting a reaction liquid that promotes aggregation of the solid content dispersed in ink from an ejection port, if a reaction liquid in which a reaction component is dissolved in a solvent is used, the reaction liquid seeps out to a wider range of the cleaning member than the solid content dispersed in the ink. If the reaction liquid that seeps out from an ejection port reaches the area where the ink has been wiped by the cleaning member, there is a risk that the solid content such as a pigment of the ink aggregates and the agglomerate adheres to the ejection port surface during the wiping operation, which may cause ejection failure from the ejection port.

SUMMARY OF THE INVENTION

The present invention has been made in view of the above-described problems, so as to provide a technique for suppressing ejection failure at an ejection port, which is caused by reaction of reaction liquid and ink during a wiping operation.

In the first aspect of the present invention, there is provided a printing apparatus including:

a printing unit in which a first ejection port array provided along a predetermined direction for ejecting ink, and a second ejection port array provided along the predetermined direction for ejecting reaction liquid that reacts with the ink, are formed side by side in a direction intersecting the predetermined direction on the same plane;

a maintenance unit configured to be capable of receiving the ink and the reaction liquid that are ejected from the printing unit and capable of wiping an ejection port surface of the printing unit on which the first ejection port array and the second ejection port array are formed; and a control unit configured to control at least one of the printing unit and the maintenance unit so that the ejection port surface is wiped by the maintenance unit along the predetermined direction by moving at least one of the printing unit and the maintenance unit in a relative manner, wherein, before the wiping is performed, the control unit executes preliminary ejection in which ink is ejected to an area of the maintenance unit between an area abutted by the first ejection port array during the wiping and an area abutted by the second ejection port array during the wiping.

In the second aspect of the present invention, there is provided a maintenance method of a printing apparatus including a printing unit in which a first ejection port array provided along a predetermined direction for ejecting ink, and a second ejection port array provided along the predetermined direction for ejecting reaction liquid that reacts with the ink, are formed side by side in a direction intersecting the predetermined direction on the same plane and a maintenance unit configured to be capable of receiving the ink and the reaction liquid that are ejected from the printing unit and capable of wiping an ejection port surface of the printing unit on which the first ejection port array and the second ejection port array are formed, the maintenance method including;

a step for executing preliminary ejection, in which ink is ejected to an area of the maintenance unit between an area abutted by the first ejection port array during the wiping and an area abutted by the second ejection port array during the wiping, before the wiping is performed by the maintenance unit; and a step for wiping the ejection port surface along the predetermined direction with the maintenance unit by moving at least one of the printing unit and the maintenance unit in a relative manner.

According to the present invention, it is possible to suppress ejection failure at an ejection port, which is caused by reaction of reaction liquid and ink during a wiping operation.

Further features of the present invention will become apparent from the following description of exemplary embodiments with reference to the attached drawings.

BRIEF DESCRIPTION OF THE DRAWINGS

FIG. 19 is a table in which the temperature of the print head are associated with a coefficient for multiplying the number of shots of ink during preliminary ejection;

FIG. 22 is a table in which a driving ratio is associated with the number of wiping times and a coefficient for multiplying the number of shots of ink at the time of the preliminary ejection.

DESCRIPTION OF THE EMBODIMENTS

Hereinafter, with reference to the accompanying drawings, detailed explanations are given of examples of an embodiment of a printing apparatus and a maintenance method. Note that the following embodiments do not limit the present invention, and every combination of the characteristics explained in the embodiments is not necessarily essential to the solutions in the present invention. Further, the relative positions, shapes, etc., of the configurations described in the embodiments are merely examples and do not limit the present invention to the range of the examples.

First Embodiment

First, with reference to FIG. 1 through FIG. 14, a printing apparatus according to the first embodiment will be explained. The printing apparatus 10 of FIG. 1 is what is termed as an inkjet printing apparatus of a serial scan type, which ejects ink to a conveyed print medium in an inkjet system while moving in a predetermined direction intersecting (orthogonally in the present embodiment) the conveyance direction.

<Configuration of the Printing Apparatus>

Figure 1:
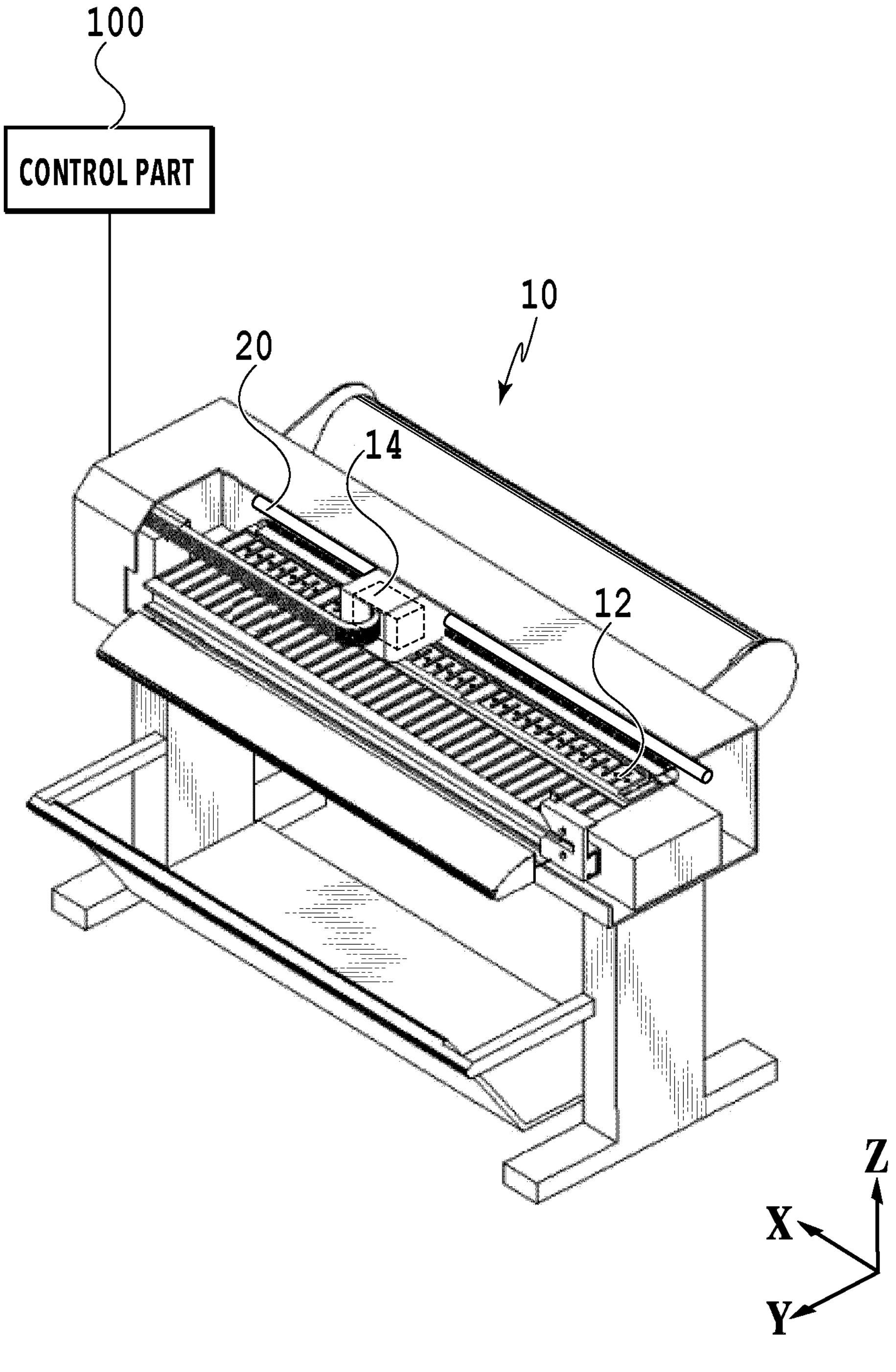
FIG. 1 is a schematic configuration diagram of a printing apparatus according to an embodiment.
Figure 2A:
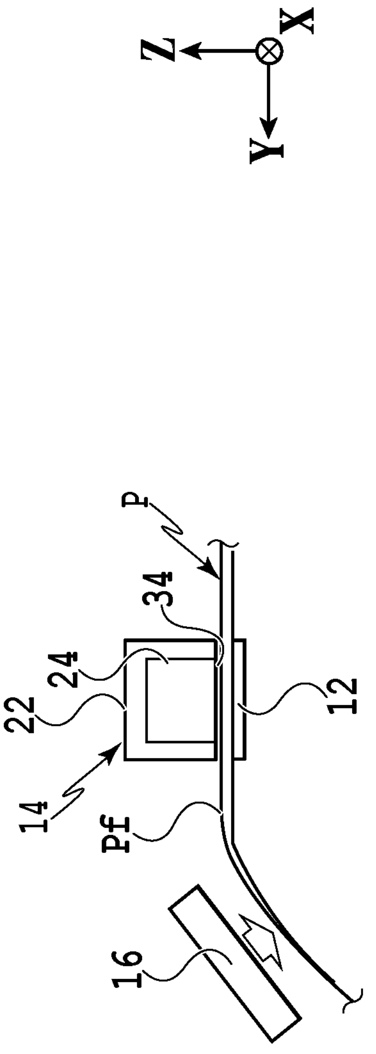
FIG. 2A and FIG. 2B are schematic configuration diagrams of main parts of the printing apparatus of FIG. 1.
Figure 2B:
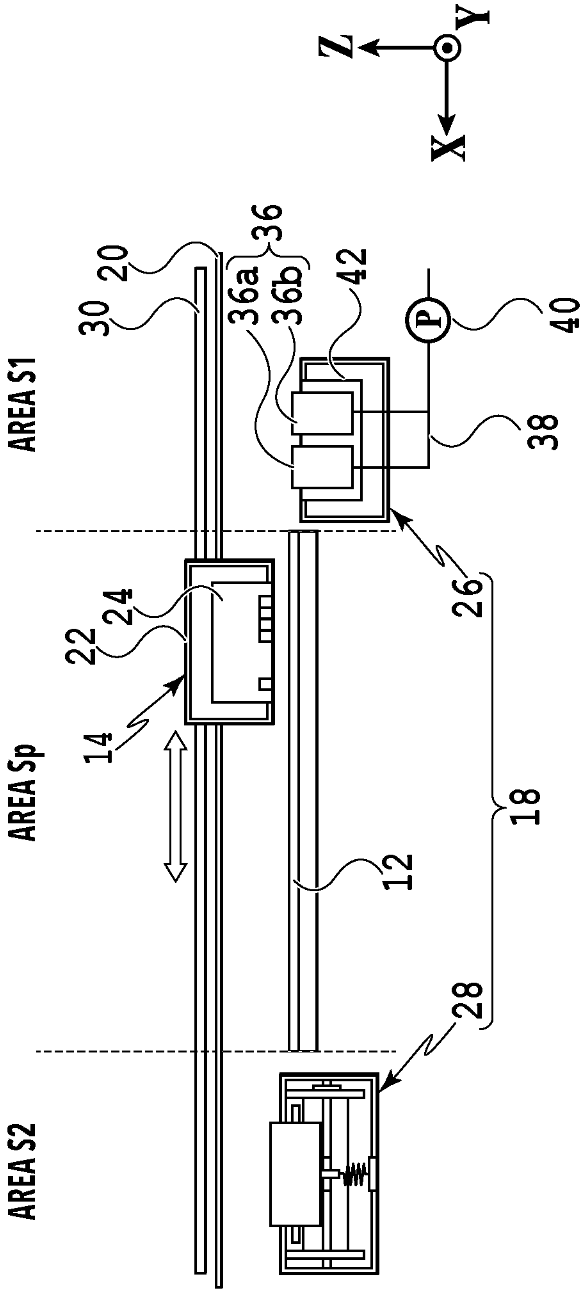

FIG. 1 is a schematic configuration diagram of a printing apparatus according to an embodiment. FIG. 2A is a diagram for explaining a heat application part in the printing apparatus, and FIG. 2B is a diagram for explaining a recovery part in the printing apparatus.

The printing apparatus 10 includes the platen 12, which supports the print medium P conveyed by a conveyance part (not illustrated in the drawings), and the printing part 14, which performs printing on the print medium P that is supported by the platen 12. Further, the printing apparatus 10 includes the heat application part 16, which applies heat to the printing surface Pf of the print medium P after printing, and the recovery part 18, which is for favorably maintaining and recovering the ink ejection state of the printing part 14. Note that the entire operation of the printing apparatus 10 is controlled by the control part 100.

The printing part 14 includes the carriage 22, which is installed on the guide shaft 20 in a movable manner, and the print head 24, which is mounted on the carriage 22 to eject ink to the print medium P that is supported by the platen 12. The guide shaft 20 extends in the X direction which intersects (orthogonally in the present embodiment) the Y direction in which the print medium P is conveyed, and the carriage 22 is configured to be movable in the +X direction and the −direction in a reciprocating manner along the guide shaft 20. The print head 24 includes the multiple ejection ports 32 (see FIG. 3) for ejecting ink, and the ejection port surface 34 (see FIG. 2A) on which the ejection ports 32 are formed is mounted on the carriage 22 so as to face the platen 12. Accordingly, in the printing apparatus 10, the print head 24 is configured to be capable of ejecting ink while reciprocating in the ±X direction.

Note that the printing apparatus 10 is equipped with the linear encoder 30 (see FIG. 2B) which extends in the X direction, so that the position of the print head 24 is controlled based on signals of the linear encoder 30. Further, the print head 24 is configured to be capable of ejecting inks of four colors and the reaction liquid RS that reacts with these inks to aggregate the solid content thereof. In the present embodiment, the inks of four colors are black (K) ink, cyan (C) ink, magenta (M) ink, and yellow (Y) ink.

The printing apparatus 10 performs printing in what is termed as a two-way printing method in which the printing part 14, that is, the print head 24 ejects ink for printing at the time of moving in the +X direction and also ejects ink for printing at the time of moving in the −X direction. If printing is started, the printing apparatus 10 moves the print head 24 to the printing start position and feeds the print medium P with the conveyance part to a position where printing can be performed by the print head 24. Next, based on print data, a printing operation of ejecting ink while moving (scanning with) the print head 24 in the +X direction (or −X direction) is performed, and, if the printing operation is completed, a conveyance operation of conveying the print medium P by a predetermined amount with the conveyance part is performed. Thereafter, a printing operation of ejecting ink while moving the print head 24 in the −X direction (or +X direction) is performed, and, if the printing operation is completed, a conveyance operation of conveying the print medium P by a predetermined amount with the conveyance part is performed again. In this way, the printing apparatus 10 performs printing on the print medium P by alternately and repeatedly executing the printing operation and the conveyance operation. Note that it is assumed that multipath printing, in which printing is performed by scanning with the printing part 14 multiple times for a unit area on a print medium, is executed in the present embodiment, for example.

The heat application part 16 blows warm air onto the printing surface Pf of the print medium P on which ink (and the reaction liquid) has been ejected from the printing part 14 for printing, in order to apply heat to the printing surface Pf and the ink applied to the printing surface Pf so as to fix the ink to the printing surface Pf.

The recovery part 18 includes the suction part 26, which is installed at a position adjacent to one end of the platen 12 in the X direction, and the maintenance part 28, which is installed at a position adjacent to the other end of the platen 12 in the X direction. That is, the suction part 26 is located in the area S1 on the one end side of the print area Sp, in which ink is ejected from the printing part 14 to the print medium P that is supported by the platen 12. Further, the maintenance part 28 is located in the area S2 on the other end side of the print area Sp. Note that a detailed explanation of the maintenance part 28 will be described later.

The suction part 26 is a configuration for performing a suctioning process, in which ink is forcibly suctioned from the multiple ejection ports 32 that eject ink in the print head 24 in order to maintain and recover the ink inside the ejection ports 32 to a suitable state for ejection. The suction part 26 includes the cap 36 which covers the ejection port surface 34 of the print head 24, the pump 40 which is installed in the tube 38 that communicates with the cap 36, and the elevating and lowering part 42 which elevates and lowers the cap 36.

The cap 36 includes the cap 36*a*, which covers a predetermined area of the ejection port surface 34 including all the ejection ports 32RS that eject the reaction liquid RS, and the cap 36*b*, which covers a predetermined area of the ejection port surface 34 including all the ejection ports 32 of the inks of the four colors. Specifically, the cap 36*b* covers the ejection ports 32K for ejecting the K ink, the ejection ports 32C for ejecting the C ink, the ejection ports 32M for ejecting the M ink, and the ejection ports 32Y for ejecting the Y ink. Note that it is also possible to configure the cap 36*b* so that the covering is performed with independent caps for the respective ink colors.

A negative pressure is generated inside the cap 36 in a state where the cap 36 is abutting on the ejection port surface 34 so as to cover the predetermined areas including the corresponding ejection ports 32, in order to forcibly suction the ink and reaction liquid from the respective ejection ports 32 with the negative pressure. Note that it is also possible that the pump 40 is configured to generate a negative pressure only in the cap 36*b* so that only the inks of the four colors can be forcibly suctioned.

The elevating and lowering part 42 moves the cap 36 in the +Z direction, that is, elevates the cap 36, so that the cap 36 abuts on the ejection port surface 34 to cover the predetermined areas including the corresponding ejection ports 32. Further, the cap 36 is moved in the −Z direction, that is, the cap 36 is lowered, so that the cap 36 is separated from the ejection port surface 34 to release the predetermined areas including the corresponding ejection ports 32.

<Configuration of the Print Head>

Figure 3:
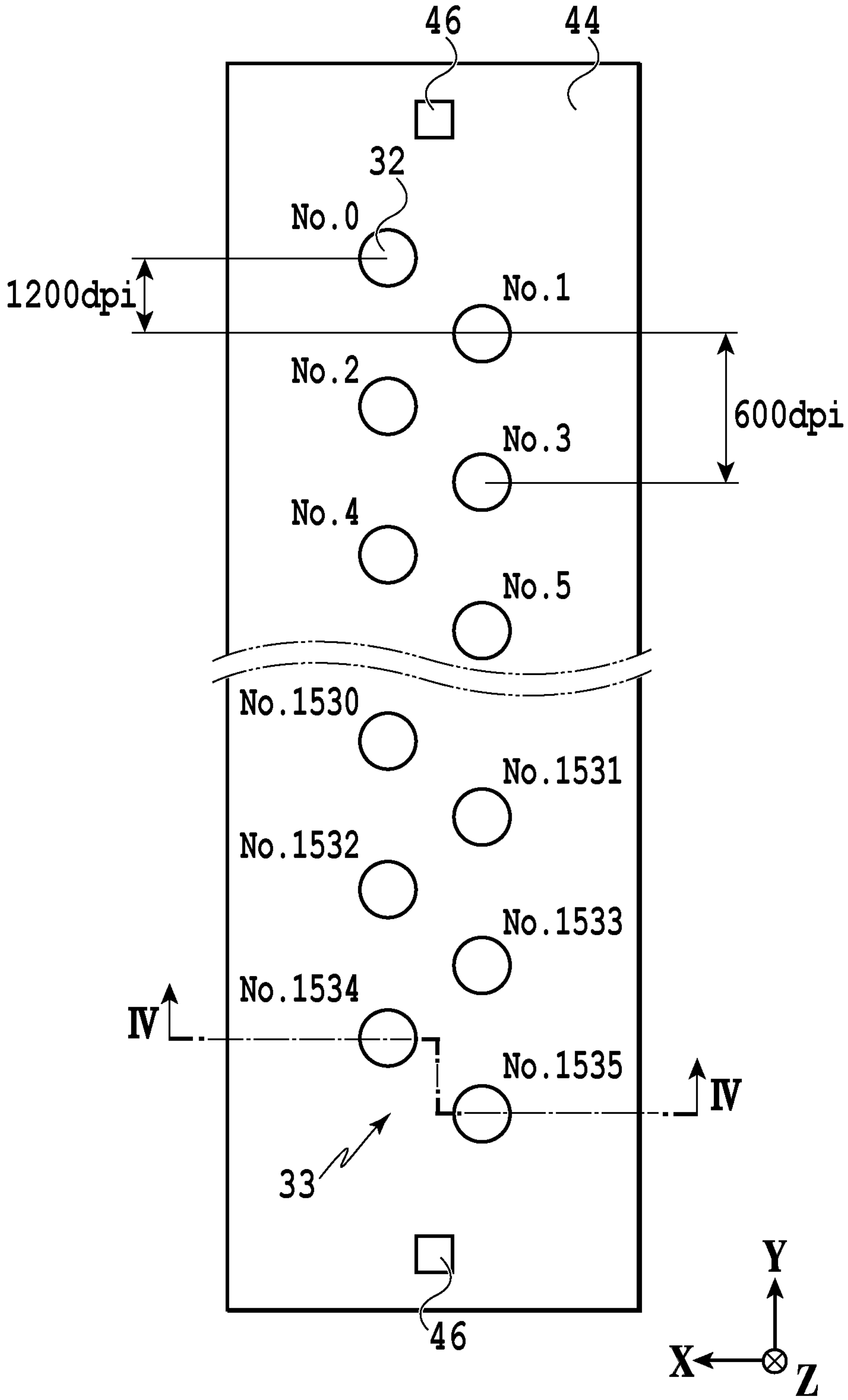
FIG. 3 is a diagram illustrating a base plate on which ejection port arrays are formed.
Figure 4:
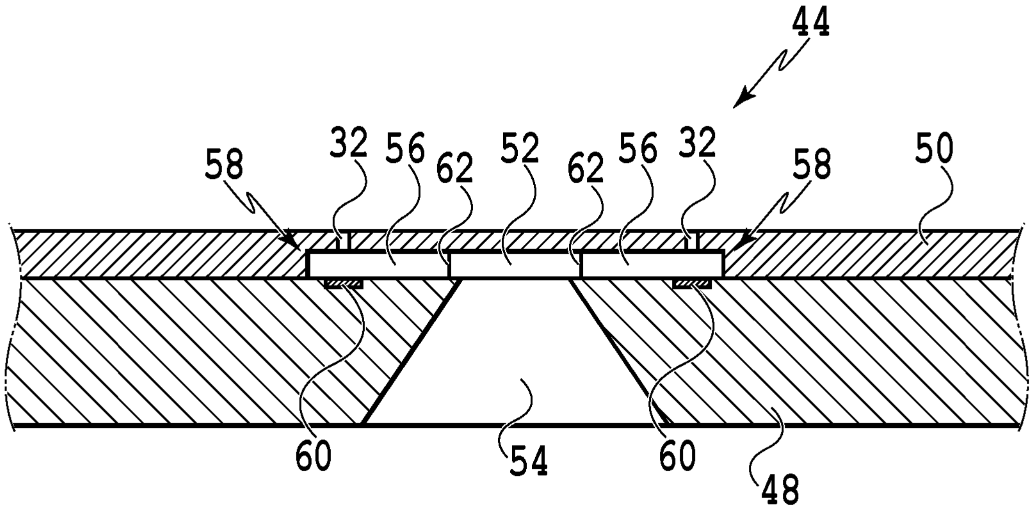
FIG. 4 is a cross-sectional view of the Iv-Iv line of FIG. 3.
Figure 5:
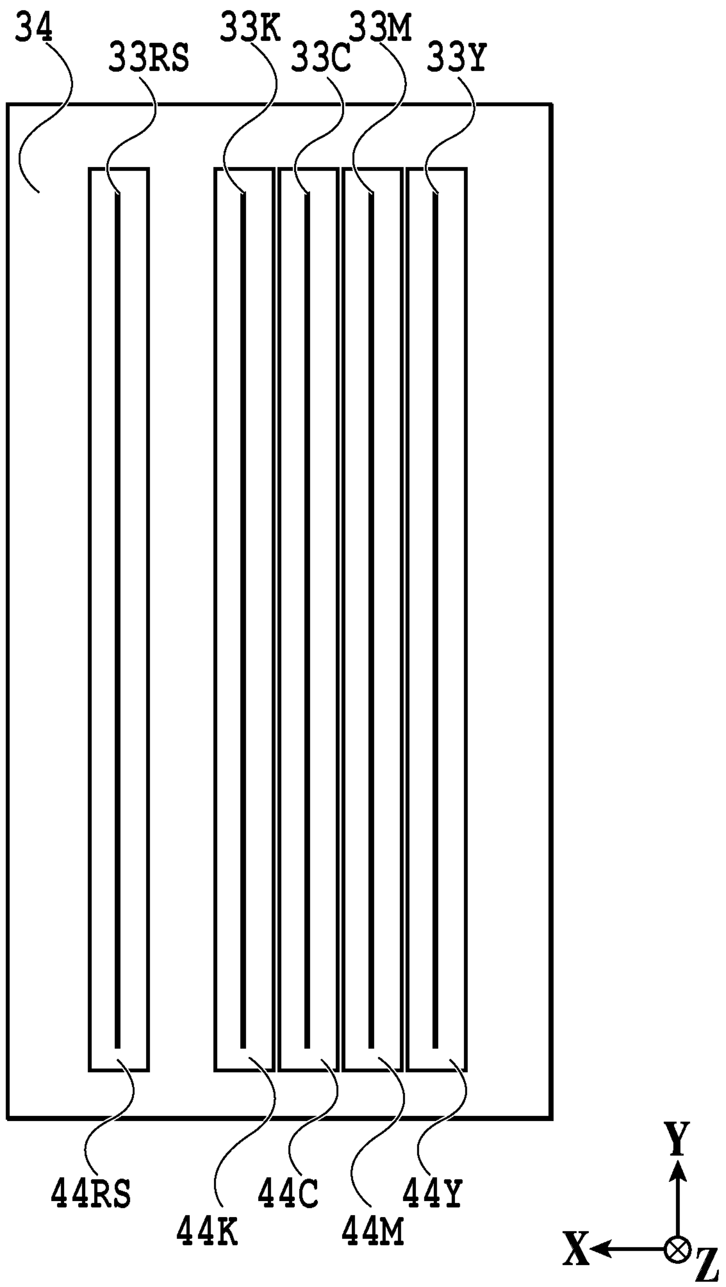
FIG. 5 is a diagram illustrating an example of the arrangement of the ejection port arrays which are formed on an ejection port surface.

Next, the configuration of the print head 24 will be explained. On the ejection port surface 34 of the print head 24, the base plates 44 on which the multiple ejection ports 32 for ejecting the inks of the respective colors and the reaction liquid are formed are arranged. FIG. 3 is a diagram illustrating the base plate 44 on which the ejection port arrays of the multiple ejection ports are formed. FIG. 4 is a cross-sectional view of the Iv-Iv line of FIG. 3. FIG. 5 is a diagram illustrating the ejection port surface 34. Note that FIG. 3 and FIG. 5 are diagrams seen from the ejection port surface 34 side.

On the base plate 44, the two arrays of ejection ports 32 for ejecting ink (or the reaction liquid) as droplets are formed along the Y direction at intervals of 600 dpi (density of 600 dots per inch) (see FIG. 3). These two arrays are formed so that, relative to one array, the other array is shifted by 1200 dpi in the Y direction. Further, in the present embodiment, the ejection port arrays 33 are formed on the base plate 44 with the two arrays which are formed with 1536 ejection ports 32.

Further, the base plate 44 is equipped with the temperature sensor 46, which is capable of detecting the temperature of the base plate 44, in the vicinity of both ends of the ejection port arrays 33 in the Y direction. The temperature sensors 46 detect the temperature by utilizing the temperature dependence of the anode-cathode voltage of a diode, for example.

In the base plate 44, the upper plate member 50 is formed on the base material 48 (see FIG. 4). The common liquid chamber 52 is formed between the base material 48 and the upper plate member 50. The common liquid chamber 52 communicates with the liquid supply port 54 to which the ink or the reaction liquid to be ejected is supplied. The liquid flow paths 56 extend from the common liquid chamber 52, and the liquid flow paths 56 communicate with the ejection ports 32 formed in the upper plate member 50.

The bubble generating chambers 58 are formed at the ends of the liquid flow paths 56 on the ejection port 32 side, and the heat generation element 60 is arranged at a position facing the ejection port 32 in each bubble generating chamber 58. In the base plate 44, the liquid flow paths 56 which allow the ejection ports 32 and the common liquid chamber 52 to communicate with each other are formed between the upper plate member 50 and the base material 48, and the partition walls 62 are formed between adjacent liquid flow paths 56.

In a case of ejecting liquid (ink and reaction liquid) from the ejection ports 32, the heat generation elements 60 are driven via the print head driver 114 (see FIG. 8), based on print signals which are output from the control part 100. By driving the heat generation elements 60, the liquid is locally heated inside the bubble generating chambers 58 by the heat generated by the heat generation elements 60. As a result, film boiling is generated to the liquid inside the bubble generating chambers 58, and the liquid is ejected from the ejection ports 32 by the pressure generated thereby. In the print head 24 of the present embodiment, the droplet ejected from each ejection port 32 is 4 ng, and the droplets can be ejected at an ejection frequency of 21 kHz at a maximum.

On the ejection port surface 34, the base plates 44 corresponding to the inks of the respective colors and the reaction liquid are installed so that the ejection port arrays 33 are parallel to the Y direction (see FIG. 5). That is, on the ejection port surface 34, in order along the +X direction, the base plate 44Y for ejecting the Y ink, the base plate 44M for ejecting the M ink, the base plate 44C for ejecting the C ink, the base plate 44K for ejecting the K ink, and the base plate 44RS for ejecting the reaction liquid RS are installed side by side. Note that the ejection port array 33Y, which is configured with the multiple ejection ports 32 for ejecting the Y ink, is formed on the base plate 44Y. The ejection port array 33M, which is configured with the multiple ejection ports 32 for ejecting the M ink, is formed on the base plate 44M. The ejection port array 33C, which is configured with the multiple ejection ports 32 for ejecting the C ink, is formed on the base plate 44C. The ejection port array 33K, which is configured with the multiple ejection ports 32 for ejecting the K ink, is formed on the base plate 44K. The ejection port array 33RS, which is configured with the multiple ejection ports 32 for ejecting the reaction liquid RS, is formed on the base plate 44RS. In this way, in the print head 24, the ejection port array 33 for ejecting the reaction liquid RS and the ejection port arrays 33 for ejecting the respective inks are formed on the same plane.

In the present embodiment, the distance between the ejection port array 33RS and the ejection port array 33K is longer than the distances between adjacent ejection port arrays 33 for ejecting ink. In the present embodiment, this distance is longer than 5 mm, for example. Further, in the present embodiment, the reaction liquid reacts with the solid contents of the colored inks, specifically, the pigments or the like contained in the colored inks, to promote the aggregation thereof. Accordingly, in the printing apparatus 10, in a case where printing is performed on a print medium that does not absorb liquid (for example, a resin sheet), thickening due to pigment aggregation is promoted by mixing the reaction liquid and a colored ink on the print medium, so that beading is suppressed and favorable image formation can be performed.

<Maintenance Part>

Figure 6:
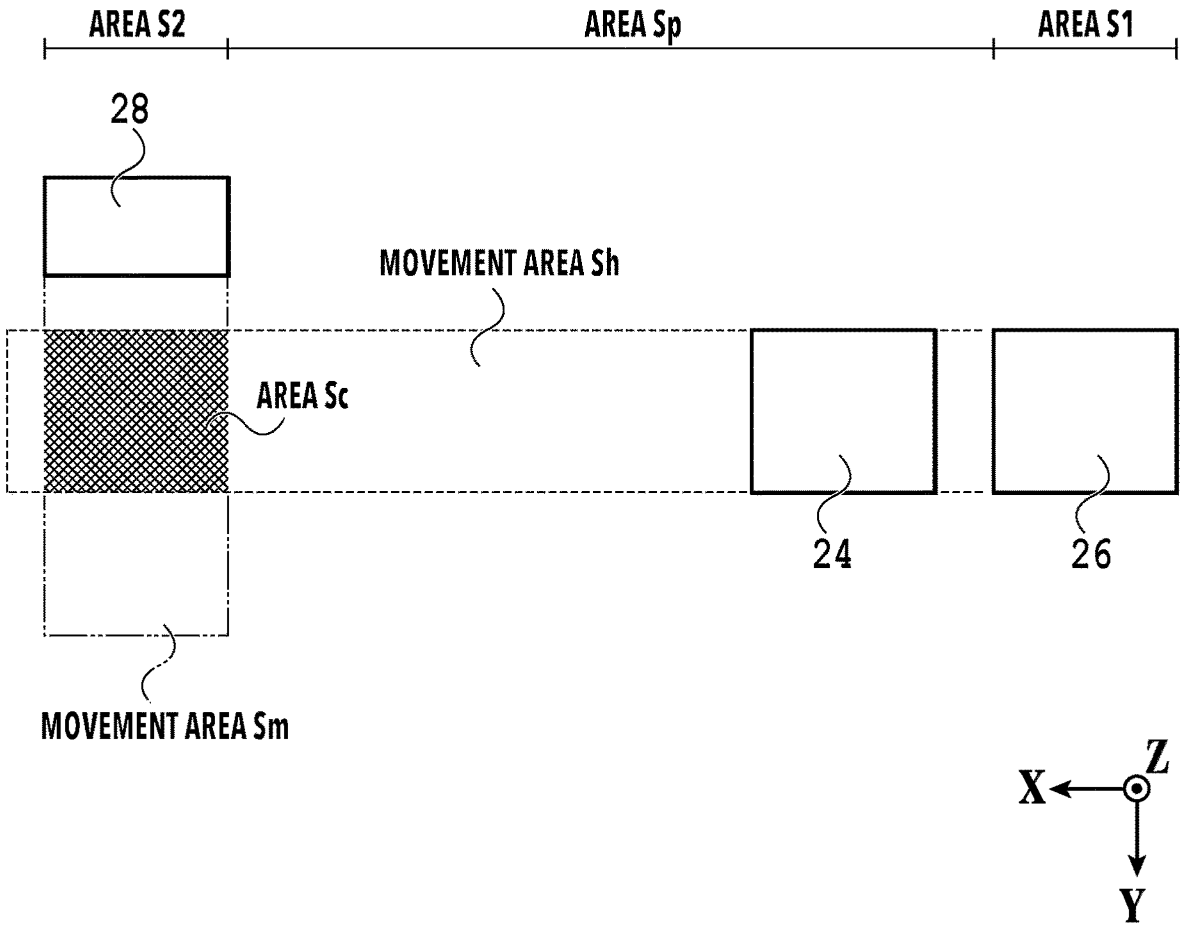
FIG. 6 is a diagram illustrating a movement area of a print head and a movement area of a maintenance part.
Figure 7A:
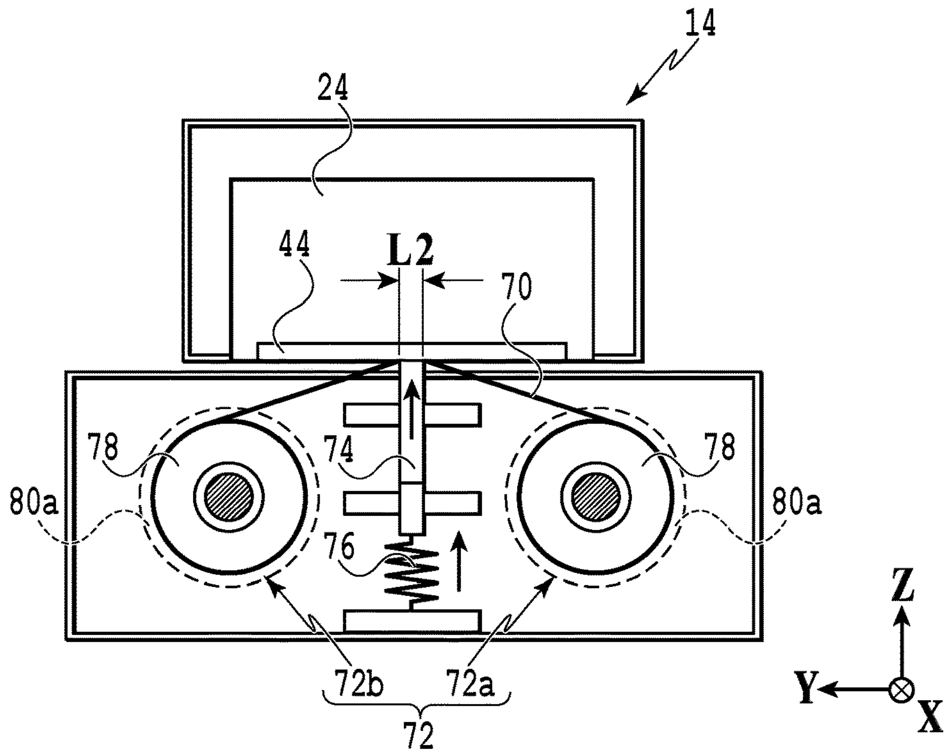
FIG. 7A and FIG. 7B are schematic configuration diagrams of the maintenance part.
Figure 7B:
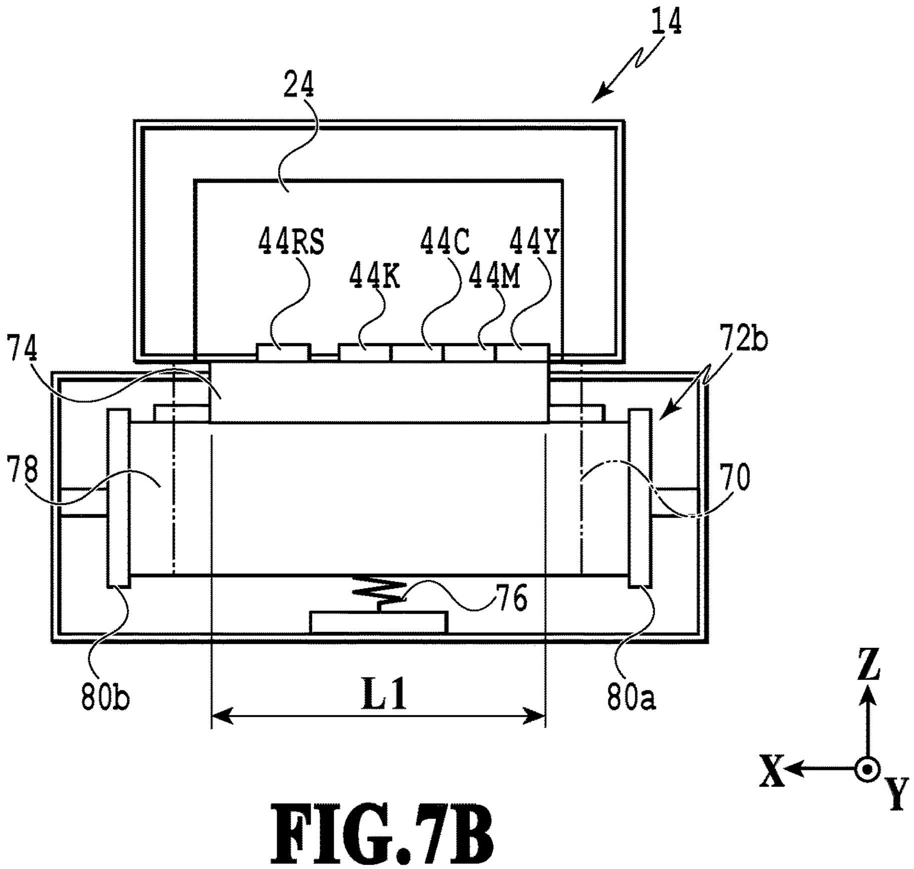

Next, the maintenance part 28 in the recovery part 18 will be explained. FIG. 6 is a diagram illustrating the movement area of the maintenance part and the movement area of the print head. FIG. 7A and FIG. 7B are schematic configuration diagrams of the maintenance part. FIG. 7A is a side view that is seen from the +X direction, and FIG. 7B is a front view that is seen from the −Y direction. Note that, in FIG. 7A and FIG. 7B, some configurations are shown by dashed lines for easy understanding.

The maintenance part 28 is installed so as to be movable in the Y direction in the area S2 on the other end side of the print area Sp. As illustrated in FIG. 6, the movement area Sm of the maintenance part 28 partially overlaps with the movement area Sh of the print head 24, which moves in the X direction. The maintenance part 28 is capable of performing reciprocal movement between the first position which does not overlap with the movement area Sh of the print head 24 in the −Y direction and the second position which does not overlap with the movement area Sh in the +Y direction.

In a case of executing the maintenance processing (which will be described later) on the ejection port surface 34 of the print head 24, the maintenance part 28 is located at the maintenance start position inside the area Sc, where the movement area Sm of the maintenance part 28 and the movement area Sh of the print head 24 overlap. Further, in a case where the maintenance processing is not being performed, the maintenance part 28 may be located at the standby position, which is located at the rearmost end (the end in the −Y direction) of the movement area Sm, or may be located at a given position which is in the first position. Note that, during the maintenance processing (the wiping process), the print head 24 is located at the wiping position, which is located inside the area Sc and in the vicinity of the other end of the movement area Sh.

The maintenance part 28 includes the cleaning member 70 which receives ink during the maintenance processing and abuts on the ejection port surface 34 for wiping off the deposits adhered to the ejection port surface 34. Further, the maintenance part 28 includes the winding part 72, which winds up the cleaning member 70, and the pressing member 74, which presses the cleaning member 70 for making the cleaning member 70 abut on the ejection port surface 34 at a predetermined pressure.

A non-woven fabric can be used as the cleaning member 70. More specifically, it is preferable to use a sheet web or a pad-like non-woven fabric which is made with fibers that are bonded or entangled by melt-adhesion or mechanical or chemical action. With the cleaning member 70, the applied ink, the ink (reaction liquid) adhering to the ejection port surface 34, or the like can be instantaneously absorbed by the capillary pressure due to the fine pores in the non-woven fabric. In the present embodiment, the cleaning member 70 functions as a wiping member that wipes the ejection port surface 34.

The winding part 72 includes the rotary member 72*a*, around which an unused cleaning member 70 is wound, and the rotary member 72*b*, around which the used cleaning member 70 is wound. The rotary member 72*b* is arranged on the +Y direction side relative to the rotary member 72*a*. The tip of the cleaning member 70 is attached to the rotary member 72*b*, and the rotary member 72*b* winds up the cleaning member 70 by rotating under the control of the control part 100. The rotary members 72*a* and 72*b* are equipped with the pair of disk members 80*a* and 80*b* installed at both ends in the X direction of the core parts 78 around which the cleaning member 70 is wound. The diameters of the disk members 80*a* and 80*b* are larger than the diameter of the core parts 78.

In the maintenance part 28, the cleaning member 70 which is located across the rotary member 72*a* and the rotary member 72*b* is exposed in a view from above (−Y direction). The size of the exposed cleaning member 70 is such that the cleaning member 70 of the maintenance part 28 that is located at the maintenance start position receives the inks and the reaction liquid ejected from each ejection port array 33 of the print head 24 that is located inside the area Sc. Further, the size of the exposed portion is such that, during movement in the movement area Sm while being pressed by the pressing member 74, at least the respective ejection port arrays 33 can be simultaneously wiped across the X direction by the cleaning member 70.

Between the rotary member 72*a* and the rotary member 72*b*, the pressing member 74 presses the cleaning member 70, which is located across the rotary member 72*a* and the rotary member 72*b*, in the +Z direction by the biasing force of the biasing member 76. The length L1 of the pressing member 74 in the X direction is such that the respective ejection port arrays 33 of the print head 24 that is located at the wiping position can be simultaneously pressed across the X direction via the cleaning member 70. Further, the length L2 of the pressing member 74 in the Y direction is a predetermined length such as about 5 mm, for example.

Further, the maintenance part 28 includes a lowering part (which is not illustrated in the drawings) which lowers the pressing member 74. This lowering part lowers the pressing member 74 against the biasing force of the biasing member 76 under the control of the control part 100. Accordingly, the maintenance part 28 can be moved inside the movement are Sm without making the cleaning member 70 abut on the ejection port surface 34.

<Control Configuration of the Printing Apparatus>

Figure 8:
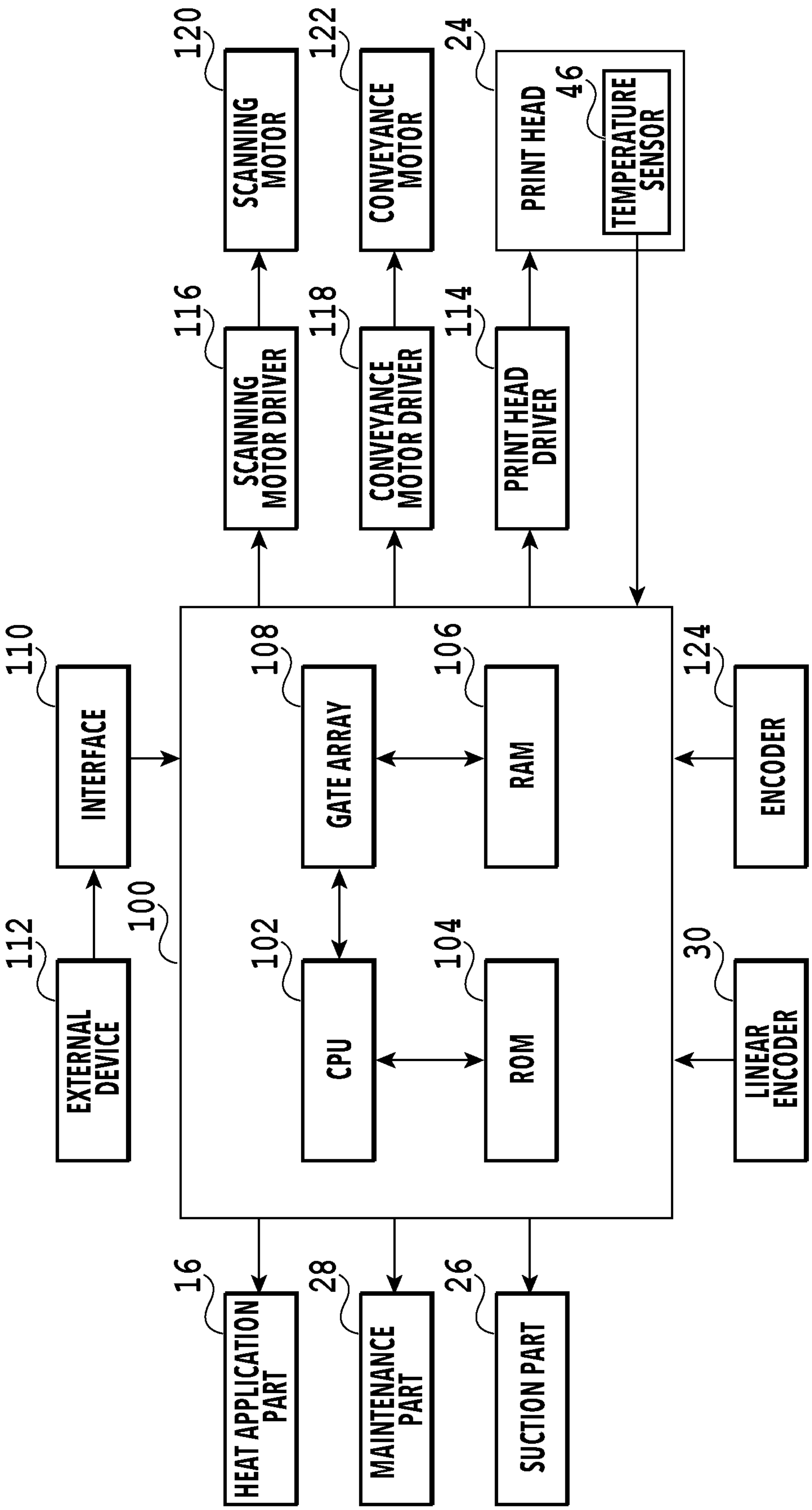
FIG. 8 is a block configuration diagram of a control system of the printing apparatus.

Next, the configuration of a control system of the printing apparatus 10 will be explained. FIG. 8 is a block configuration diagram of the control system of the printing apparatus 10.

The control part 100 that controls the entire printing apparatus 10 includes the central processing unit (CPU) 102, the ROM 104, the RAM 106, and the gate array 108. The CPU 102 controls the operation of each constituent member in the printing apparatus 10 and processes input image data, based on various programs. The ROM 104 functions as a memory for performing various kinds of control executed by the CPU 102 and for storing processing programs for image data. The RAM 106 saves various kinds of data (image data, a print signal which is output to the print head 24, etc.) to be used for controlling the printing apparatus. The gate array 108 supplies a print signal to the print head 24 and also transmits data among the interface 110 (which will be described later), the CPU 102, and the RAM 106.

The control part 100 is connected to the interface 110, and the information that is output from the external device 112 is input via the interface 110. The user inputs image data and various kinds of information to the printing apparatus 10 via the external device 112. Further, the control part 100 is connected to the print head driver 114, the scanning motor driver 116, and the conveyance motor driver 118. The print head driver 114 drives the print head 24 (heat generation element) to eject ink, based on a print signal which is output from the control part 100. The scanning motor driver 116 drives the scanning motor 120 to move the carriage 22 in the X direction, based on a signal that is output from the control part 100 according to a signal from the linear encoder 30. The conveyance motor driver 118 drives the conveyance motor 122 to convey the print medium with the conveyance part, based on a signal that is output from the control part 100 according to a signal from the encoder 124 which obtains information corresponding to the conveyance amount in the conveyance part.

In the control part 100, the CPU 102 and the gate array 108 convert image data that is input from the external device 112 via the interface 110 into print data and store the print data in the RAM 106. Further, the control part 100 activates the print head driver 114, the scanning motor driver 116, and the conveyance motor driver 118 in a synchronized manner, in order to perform a printing operation with the printing part 14 and a conveyance operation with the conveyance part. Accordingly, the image based on the print data is printed on the print medium.

Further, the control part 100 is connected to the temperature sensors 46 which are installed on the base plates 44 in the print head 24, so as to be capable of obtaining temperature information of the base plates 44, that is, the ink (reaction liquid) ejected from the base plates 44. In the present embodiment, the temperature sensors 46 function as a detection part which is capable of detecting the temperature of the print head 24 equipped with the base plates 44. Further, the control part 100 is connected to the heat application part 16 and outputs, to the heat application part 16, a signal for driving the heat application part 16 to apply heat to the print medium after printing. Further, the control part 100 is connected to the suction part 26 and the maintenance part 28 and drives the suction part 26, the maintenance part 28, the print head 24, and the scanning motor 120, so as to perform the suctioning processing with the suction part 26 and the maintenance processing with the maintenance part 28. In the present embodiment, the control part 100 functions as a control part that controls the print head 24, the maintenance part 28, etc., in order to execute the maintenance processing.

<Inks and Reaction Liquid>

Next, the inks and the reaction liquid used in the printing apparatus 10 will be explained. In the present embodiment, the printing apparatus 10 can use a colored ink containing a pigment and a water-soluble resin fine particle ink containing no pigment or containing a trace amount of pigment. These colored ink and water-soluble resin fine particle ink contain a water-soluble organic solvent. Note that, regarding the colored ink and the water-soluble resin fine particle ink used in the printing apparatus 10, various kinds of surfactants, defoaming agents, preservatives, antifungal agents, etc., can be added as appropriate, in order to acquire desired characteristics as needed.

The colored ink contains water-soluble resin fine particles for bringing the print medium and the coloring materials into close contact with each other and improving the scratch resistance (fixability) of printed images. The resin fine particles are melted by heat, and a heater (the heat application part 16 or the like) is used to form a film of the resin fine particles and dry the solvent contained in the ink. In the present embodiment, the resin fine particles are polymer fine particles that exist in a state of being dispersed in water. Further, the polymer fine particles existing in a state of being dispersed in water may be in a form of resin fine particles obtained by homopolymerizing a monomer having a dissociative group or copolymerizing multiple types of monomers, i.e., what is termed as the self-dispersion pigment fine particle dispersion. Carbon black is used as the pigment of the K ink, C.I. Pigment Blue 15: 3 is used as the pigment of the C ink, C.I. Pigment Red is used as the pigment of the M ink, and C.I. Pigment Yellow 74 is used as the pigment of the Y ink.

The reaction liquid RS used in the printing apparatus 10 contains a reactive component that reacts with the pigment contained in each ink to aggregate or gel the pigment. The reactive component is a component capable of destroying the dispersion stability of the ink if being mixed with an ink having a pigment that is stably dispersed in an aqueous medium due to the action of an ionic group.

<Maintenance Processing>

With the above configurations, if the print processing for performing printing on a print medium based on print data is started, the printing apparatus 10 performs the maintenance processing at a predetermined timing during the print processing. The predetermined timing is, for example, a timing after performing the printing operations of scanning with printing in the +X direction and the −X direction with the printing part 14 ten times each, i.e., a timing after performing the printing operations for ten round trips.

Figure 9:
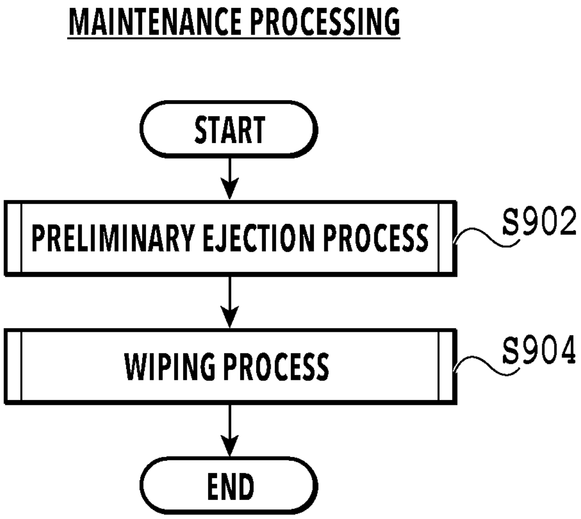
FIG. 9 is a flowchart of the maintenance processing.
Figure 10:
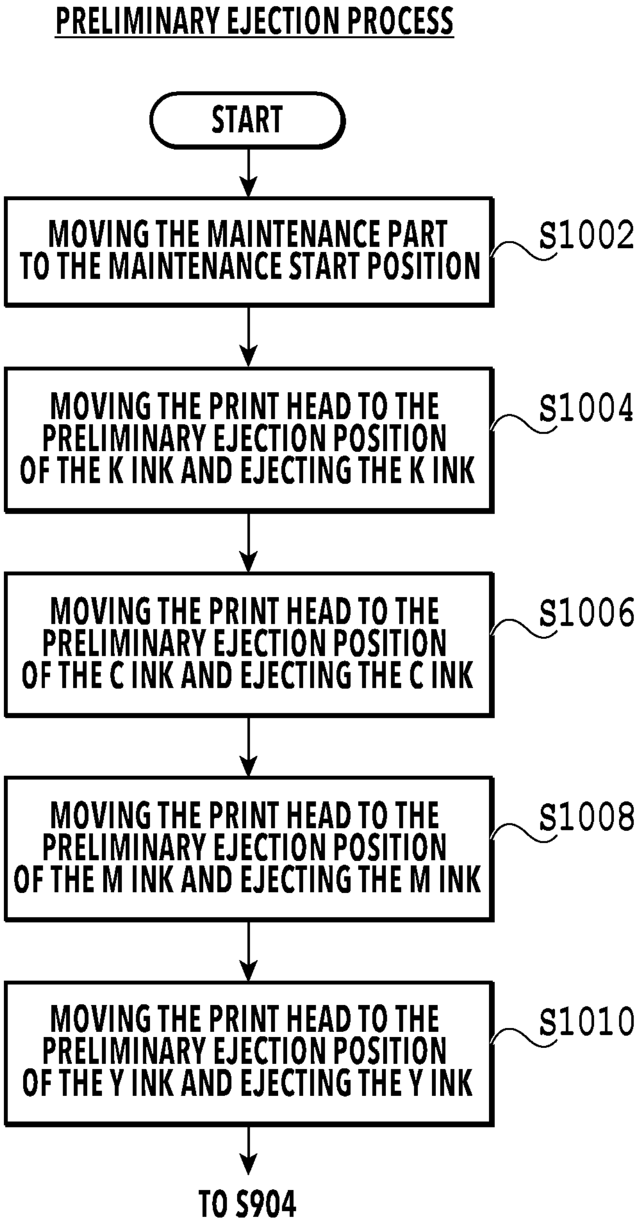
FIG. 10 is a flowchart of a preliminary ejection process, which is a subroutine of the maintenance processing of FIG. 9.
Figure 11:
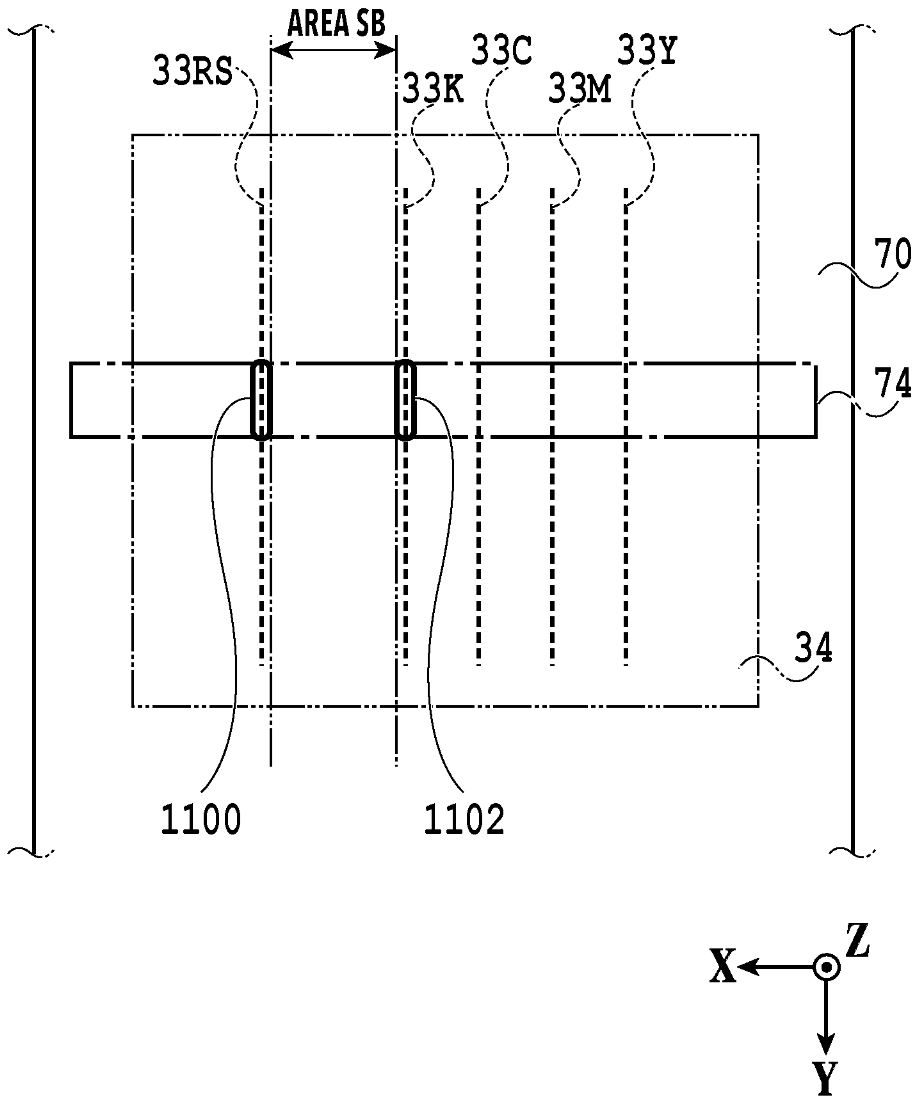
FIG. 11 is a diagram illustrating positions where the preliminary ejection is performed by the maintenance part.
Figure 12:
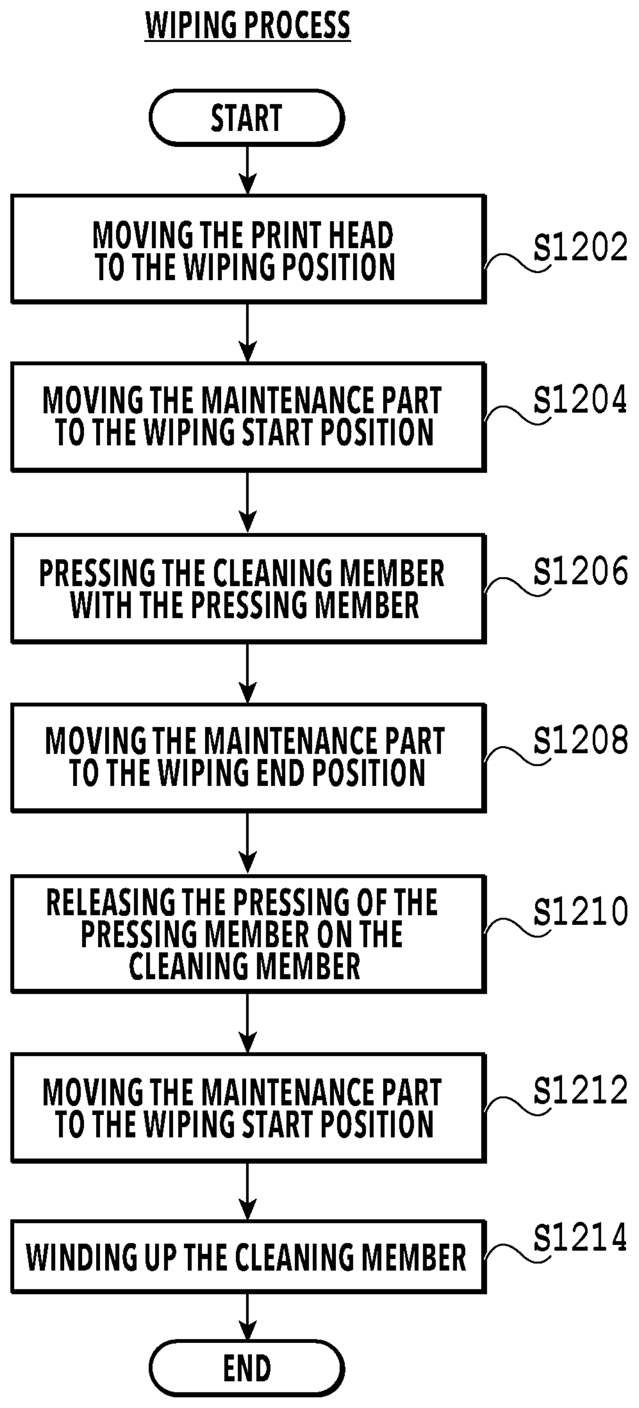
FIG. 12 is a flowchart of a wiping process, which is a subroutine of the maintenance processing of FIG. 9.
Figure 13A:
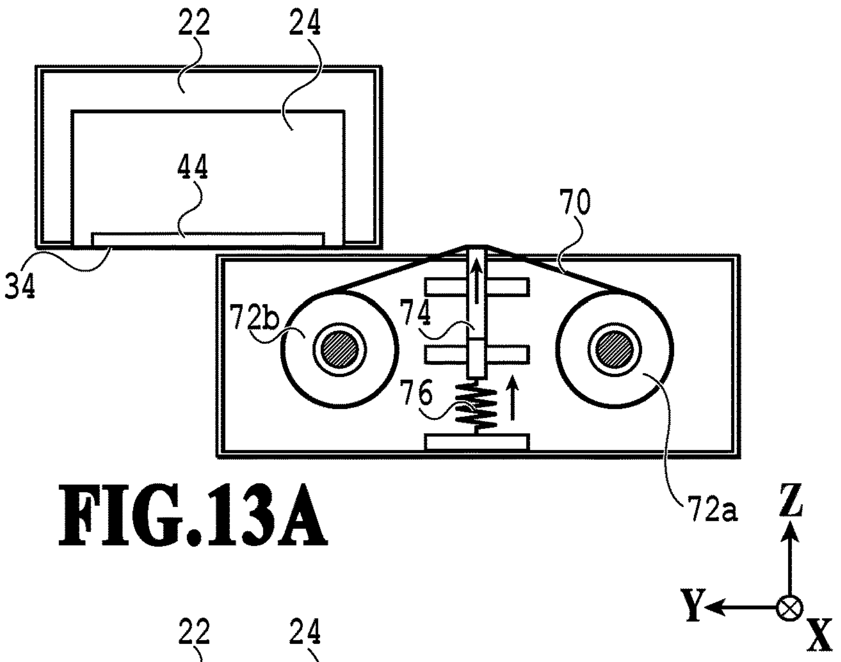
FIG. 13A to FIG. 13C are diagrams for explaining an operation of the maintenance part during the wiping process.
Figure 13B:
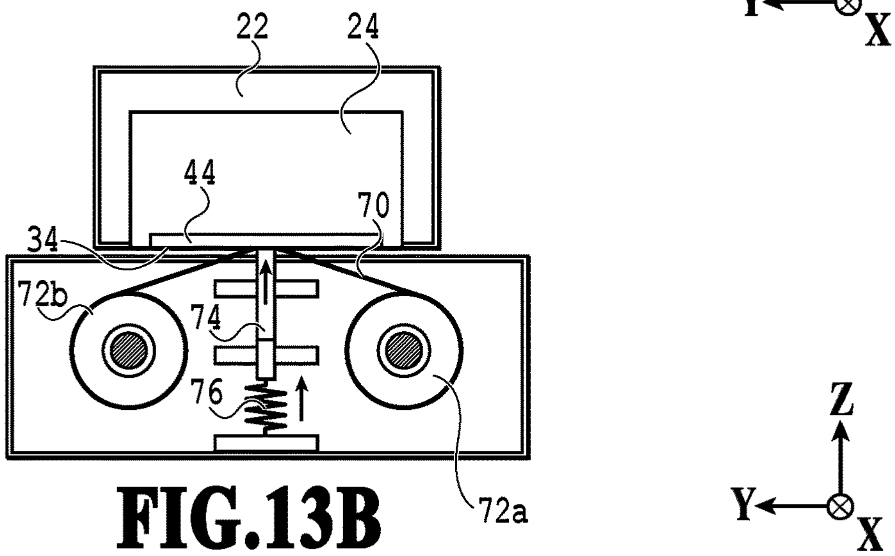
Figure 13C:
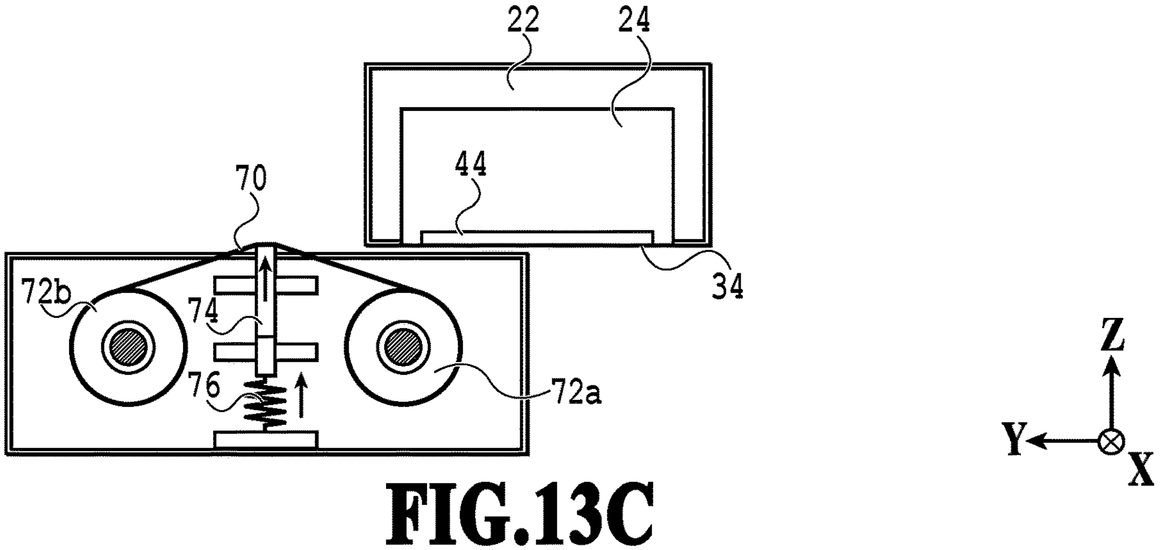

FIG. 9 is a flowchart illustrating a detailed processing routine of the maintenance processing. FIG. 10 is a flowchart illustrating a detailed processing routine of a preliminary ejection process, which is a subroutine of the processing routine illustrated in FIG. 9. FIG. 11 is a diagram illustrating a preliminary ejection position of each ink. FIG. 12 is a flowchart illustrating a detailed processing routine of a wiping process, which is a subroutine of the processing routine illustrated in FIG. 9. FIG. 13A to FIG. 13C are diagrams for explaining the wiping operation of the maintenance part.

The series of these processes illustrated in the flowcharts of FIG. 9, FIG. 10, and FIG. 12 is performed by the CPU 102 loading a program code stored in the ROM 104 into the RAM 106 and executing the program code. Alternatively, a part or all of the functions in the steps of FIG. 9, FIG. 10, and FIG. 12 may be executed by hardware such as an ASIC or an electronic circuit. Note that the sign "S" in the explanation of each process means that it is a step of the flowcharts. Further, the same applies to the explanations of the preliminary ejection process and the wiping process described in other embodiments.

If the printing operations are performed for ten round trips during the print processing, the control part 100 starts the maintenance processing for the print head 24. Note that, if the maintenance processing ends, the control part 100 restarts the print processing, and, if the printing operations are performed for ten round trips again, the maintenance processing will be executed again.

If the maintenance processing is started, first, the preliminary ejection process for performing preliminary ejection, which is to eject ink that does not contribute to printing of an image on a print medium, is executed (S902). Thereafter, the wiping process of wiping the ejection port surface 34 with the cleaning member 70 is executed (S904). Then, this maintenance processing ends.

=Preliminary Ejection Process=

In the preliminary ejection process, first, the CPU 102 moves the maintenance part 28 to the maintenance start position (S1002). In S1002, the maintenance part 28 in the standby position (or the first position) that does not overlap with the movement area Sh of the print head 24 is moved to the maintenance start position, which is set inside the area Sc where the movement area Sm of the maintenance part 28 overlaps with the movement area Sh (see FIG. 6). Accordingly, the cleaning member 70 faces the ejection port surface 34 of the print head 24 that has moved into the area Sc. Note that, during the execution of this preliminary ejection process, the pressing member 74 does not press the cleaning member 70 in the maintenance part 28.

Next, the CPU 102 moves the print head 24 to the preliminary ejection position for performing preliminary ejection of the K ink, and a predetermined amount of K ink is ejected at the preliminary ejection position (S1004). Here, the preliminary ejection position for performing the preliminary ejection of the K ink will be explained. In FIG. 11, the positions of the ejection port surface 34 and the ejection port arrays 33 in a case where the print head 24 is located at the wiping position, which is the position for the later-described wiping process, whereas the maintenance part 28 is located at the maintenance start position are indicated by the dashed lines. In the wiping process, the maintenance part 28 moves in the Y direction in a state where the cleaning member 70 is pressed by the pressing member 74 against the print head 24 at the wiping position, so as to wipe the ejection port surface 34. Therefore, each ejection port array 33 abuts on the area pressed by the pressing member 74 of the cleaning member 70. The preliminary ejection position for the preliminary ejection of the K ink is a position where the K ink can be ejected inside the area SB, which is located between the area 1100 on which the ejection port array 33RS abuts during the wiping process and the area 1102 on which the ejection port array 33K abuts during the wiping process, with respect to the X direction.

After the preliminary ejection of the K ink is completed, the CPU 102 next moves the print head 24 to the preliminary ejection position for performing preliminary ejection of the C ink, and a predetermined amount of C ink is ejected at the preliminary ejection position (S1006). The preliminary ejection position for the preliminary ejection of the C ink is a position where the C ink can be ejected inside the area SB.

After the preliminary ejection of the C ink is completed, the CPU 102 next moves the print head 24 to the preliminary ejection position for performing preliminary ejection of the M ink, and a predetermined amount of M ink is ejected at the preliminary ejection position (S1008). The preliminary ejection position for the preliminary ejection of the M ink is a position where the M ink can be ejected inside the area SB.

After the preliminary ejection of the M ink is completed, the CPU 102 next moves the print head 24 to the preliminary ejection position for performing preliminary ejection of the Y ink, and a predetermined amount of Y ink is ejected at the preliminary ejection position (S1010). The preliminary ejection position for the preliminary ejection of the Y ink is a position where the Y ink can be ejected inside the area SB.

Regarding S1004 to S1010, the preliminary ejection is executed in a state where the maintenance part 28 is stopped at the maintenance start position and a state where the print head 24 is stopped at the preliminary ejection position of the ink to be preliminarily ejected. If the preliminary ejection of each ink is completed in this way, the processing proceeds to the wiping process of S904. The predetermined amount for the preliminary ejection of each ink is set in advance. This predetermined amount is changed depending on the type of ink and reaction liquid to be used and, for example, is obtained in an experiment and set. The specific method for obtaining this predetermined amount will be described later. As the predetermined amount, for example, 100 ink droplets are ejected from each ejection port at an ejection frequency of 5 kHz.

The preliminary ejection position of each ink may be the same position or different positions as long as the corresponding ink can be ejected into the area SB. Further, the processing order of the respective processes of S1004 to S1010 is not limited to as described above and may be appropriately changed according to the configurations of the print head 24 and the printing apparatus 10, etc. Further, although the preliminary ejection is executed for all the inks of the K ink, C ink, M ink, and Y ink in the description, there is not a limitation as such. That is, it is also possible that the preliminary ejection is performed only for a preset ink color. That is, in the above-described preliminary ejection process, it is sufficient as long as the preliminary ejection of ink of at least one color is performed.

Although the area SB is the area between the ejection port array 33RS and the ejection port array 33K in the description since the ejection port arrays 33 are installed in the order illustrated in FIG. 5 with respect to the X direction, the area SB is not limited as such. That is, the area SB is an area between the ejection port array 33RS and the ejection port array 33 for ejecting ink that is located next to the ejection port array 33RS.

=Wiping Process=

In the wiping process, first, the CPU 102 moves the print head 24 to the wiping position (S1202). As illustrated in FIG. 11, the wiping position is the position where the entire surface of the ejection port surface 34 faces the cleaning member 70 of the maintenance part 28 located at the maintenance start position. Further, the CPU 102 causes the maintenance part 28, which was located at the maintenance start position during the preliminary ejection process, to move to the wiping start position (S1204). The wiping start position is a position at which the cleaning member 70 is not abutting on the carriage 22 and the print head 24 in a state where the cleaning member 70 is pressed by the pressing member 74 and is a position on the −Y direction side relative to the print head 24 (see FIG. 13A).

Next, the CPU 102 causes the pressing member 74 to be in a state of pressing the cleaning member 70 (S1206) and, while maintaining that state, causes the maintenance part 28 to move in the +Y direction to the wiping end position (S1208). If the maintenance part 28 moves in the +Y direction from the wiping start position, the portion pressed by the pressing member 74 of the cleaning member 70 abuts on the ejection port surface 34. Here, the ejection port surface 34 is pressed by the cleaning member 70 with a predetermined pressure due to the biasing force of the biasing member 76. Then, by further moving the maintenance part 28 in the +Y direction, the ejection port surface 34 is wiped while being pressed by the cleaning member 70, so that the deposits adhering to the ejection port surface 34 are removed by the cleaning member 70 (see FIG. 13B). In this way, the maintenance part 28 performs the operation of wiping the ejection port surface 34 in S1208. The wiping end position is a position at which the cleaning member 70 is not abutting on the carriage 22 and the print head 24 in a state where the cleaning member 70 is pressed by the pressing member 74 and is a position on the +Y direction side relative to the print head 24 (see FIG. 13C).

By the way, in a case where the ejection port surface 34 is wiped by the pressing part of the pressing member 74 in the cleaning member 70, the inks and the reaction liquid may seep out from the ejection ports 32 of the respective ejection port arrays 33. In the present embodiment, the preliminary ejection process of ink is performed before the wiping process, and, in the preliminary ejection process, the ink is ejected to the area SB, which is between the area 1100 on which the ejection port array 33RS for ejecting the reaction liquid RS abuts and the area 1102 on which the ejection port array 33K for ejecting the K ink abuts.

Therefore, with the cleaning member 70, even if the reaction liquid RS seeps out from the ejection ports 32 during the wiping operation in S1208, the reaction liquid RS that seeps out comes into contact with the preliminarily ejected ink before reaching the area on which the ejection port array 33K abuts. As a result, the reaction liquid RS that seeps out reacts with the preliminarily ejected ink, so that the reaction liquid RS that seeps out is less likely to come into contact with the area 1102 or the K ink that seeps out. Therefore, the generation of agglomerates due to the reaction of the K ink and the reaction liquid RS is suppressed in the area 1102 or its vicinity in the cleaning member 70, so that the ejection failure caused by such agglomerates is suppressed.

As described above, in the present embodiment, the spread of the reaction liquid RS that seeps out is regulated by the preliminarily ejected ink. Therefore, in the preliminary ejection process, the predetermined amount, which is the number of shots of each ink to be preliminary ejected, is set in such a manner as follows, for example. Here, the inks and the reaction liquid seep out from the areas where the cleaning member 70 abuts on the ejection port arrays 33 during the wiping process. That is, the reaction liquid RS seeps out from the area 1100, and the K ink seeps out from the area 1102. Therefore, the number of shots of ink corresponding to the predetermined amount is set to the lower limit value of the numbers of shots capable of regulating the reaction liquid RS that seeps out from the area 1100 so as not to spread to the area 1102 (or its vicinity) at a frequency not exceeding the maximum frequency of the print head 24. Alternatively, the number of shots of ink corresponding to the predetermined amount is set to a value that is greater than the lower limit value by a certain value.

Thereafter, the CPU 102 releases the pressing of the pressing member 74 on the cleaning member 70 at the wiping end position (S1210). In S1210, the CPU 102 drives the lowering part (not illustrated in the drawings) to lower the pressing member 74 against the biasing force of the biasing member 76. Then, the CPU 102 moves the maintenance part 28 in the −Y direction to the wiping start position while maintaining the state in which the pressing of the pressing member 74 on the cleaning member 70 is released (S1212). In S1212, since the pressing of the pressing member 74 on the cleaning member 70 is released, the cleaning member 70 does not abut on the ejection port surface 34 while moving to the wiping start position.

If the maintenance part 28 moves to the wiping start position, the CPU 102 drives the rotary member 72*b* to wind up the cleaning member 70 (S1214) and ends the maintenance processing by ending this wiping process. The winding amount of the cleaning member 70 in S1214 is an amount corresponding to the length of the pressing member 74 in the Y direction. For example, in the present embodiment, since the length of the pressing member 74 in the Y direction is about 5 mm, the cleaning member 70 is wound up by an amount corresponding to this length. Alternatively, it is also possible that the cleaning member 70 is wound up by a certain amount longer than the length of the pressing member 74 in the Y direction in consideration of the seepage of the inks and the reaction liquid into the cleaning member 70 at the time of wiping. After the cleaning member 70 is wound up in S1214, the cleaning member 70 is in a state where the wiped deposits do not adhere to the area 1100, the area 1102, etc.

As explained above, in the printing apparatus 10 according to the present embodiment, the preliminary ejection process of preliminarily ejecting ink to the cleaning member 70 is executed before the wiping process of wiping the ejection port surface 34 with the cleaning member 70. During the preliminary ejection process, the ink is ejected to the area SB of the cleaning member 70 between the ejection port array for ejecting the reaction liquid and the ejection port array for ejecting ink that is adjacent to the ejection port array for ejecting the reaction liquid. Accordingly, even if the reaction liquid RS seeps out from the ejection ports 32 to the cleaning member 70 during the wiping operation, the reaction liquid RS that seeps out reacts with the preliminarily ejected ink, so that the reaction liquid RS is regulated so as not to spread to the area on which the ejection port array adjacent to the ejection port array of the reaction liquid RS abuts. Therefore, during the wiping process, the occurrence of ejection failure due to reaction of the reaction liquid seeping out to the cleaning member 70 with ink is suppressed.

Second Embodiment

Next, with reference to FIG. 14, the printing apparatus according to the second embodiment will be explained. Note that, in the following explanation, the same or corresponding configurations as those of the above-described first embodiment are assigned with the same reference signs as those used in the first embodiment, so as to omit the detailed explanations thereof.

The second embodiment is different from the above-described first embodiment in the aspect that the ink ejection amount (number of shots) at the time of preliminary ejection is changed for each ejection port array 33 according to the position of the ejection port 32.

Hereinafter, the ejection amount in the preliminary ejection process of each ink will be explained in detail. During the wiping operation, since the portion pressed by the pressing member 74 of the cleaning member 70 comes into contact with the ejection port surface 34, the reaction liquid RS seeps out and spreads from the area 1100 that overlaps with the area of the portion with which the ejection port array 33RS makes contact (see FIG. 11). Accordingly, the amount of the reaction liquid RS seeping out decreases more at a position further away from the center, which is the area 1100. Therefore, the amount of ink for regulating the spread of the reaction liquid RS that seeps out, that is, the number of shots of ink at the time of preliminary ejection, is smaller at a position away from the area 1100 than at a position in the vicinity of the area 1100.

Therefore, in the present embodiment, in the preliminary ejection process, the ejection amount of the ink to be preliminarily ejected is set to be the largest in the portion of the cleaning member 70 pressed by the pressing member 74 and to be decreased more at a position further away from the portion. Note that, in the present embodiment, it is assumed that the pressing member 74 in the maintenance part 28 at the maintenance start position is located at an approximately central position of the ejection port arrays 33 in the print head 24 at the wiping position with respect to the Y direction.

Figure 14:
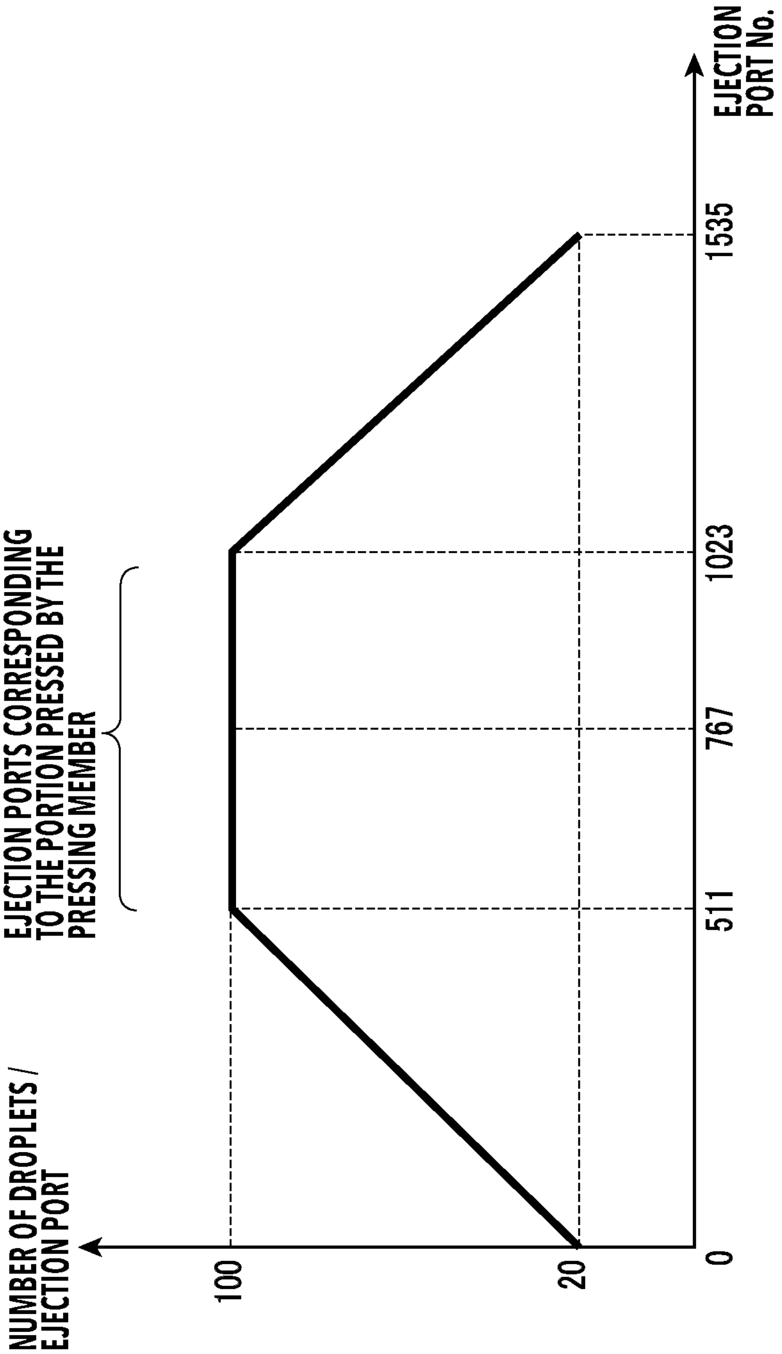
FIG. 14 is a graph illustrating the number of shots of ink during the preliminary ejection at each ejection port of the ejection port arrays.

FIG. 14 is a diagram illustrating an example in which the ejection amount of the ink to be preliminarily ejected is changed. In S1004, S1006, S1008, and S1010 of the preliminary ejection process, the number of droplets of ink ejected from the ejection ports 32 of the ejection port arrays 33 is set as illustrated in FIG. 14, and the ink is ejected at an ejection frequency of 5 kHz. Specifically, each ejection port array 33 is formed with 1536 ejection ports 32, and each ejection port 32 is assigned with any of ejection port No. 0 to 1535 in order from one end toward the other end in the Y direction. Further, the ejection ports 32 of the ejection port No. 511 to 1023, which correspond to the portion of the cleaning member 70 pressed by the pressing member 74, are controlled to eject 100 shots of ink droplets. Further, from the ejection port No. 511 toward the ejection port No. 0, the number of droplets is decreased more at a position further away from the ejection port No. 511, and the ejection port 32 corresponding to the ejection port No. 0 ejects 20 ink droplets. Furthermore, from the ejection port No. 1023 toward the ejection port No. 1535, the number of droplets is decreased more at a position further away from the ejection port No. 1023, and the ejection port 32 corresponding to the ejection port No. 1535 ejects 20 ink droplets.

According to the experiment by the inventor of the present application, in the cleaning member 70, the spread of the reaction liquid RS that seeped out from the ejection port array 33RS to the area 1102, with which the ejection port array 33K makes contact, and its vicinity could be regulated by the preliminarily ejected ink as described above.

As explained above, in the printing apparatus 10 according to the present embodiment, the ejection amount (the number of shots) of the ink to be preliminarily ejected is set to be the largest in the portion of the cleaning member 70 pressed by the pressing member 74 and to be decreased more at a position further away from the portion. Therefore, in the printing apparatus according to the present embodiment, in addition to the effects of the above-described first embodiment, the consumption amount of ink can be suppressed.

Third Embodiment

Next, with reference to FIG. 15 through FIG. 17B, the printing apparatus according to the third embodiment will be explained. Note that, in the following explanation, the same or corresponding configurations as those of the above-described first embodiment are assigned with the same reference signs as those used in the first embodiment, so as to omit the detailed explanations thereof.

The third embodiment is different from the above-described first embodiment in the aspect that the ink ejection amount at the time of preliminary ejection is changed for each ejection port array 33 according to the position of the ejection port 32. Further, the third embodiment is different from the above-described second embodiment in the aspect that ink is ejected while moving the print head 24 during preliminary ejection.

Figure 15:
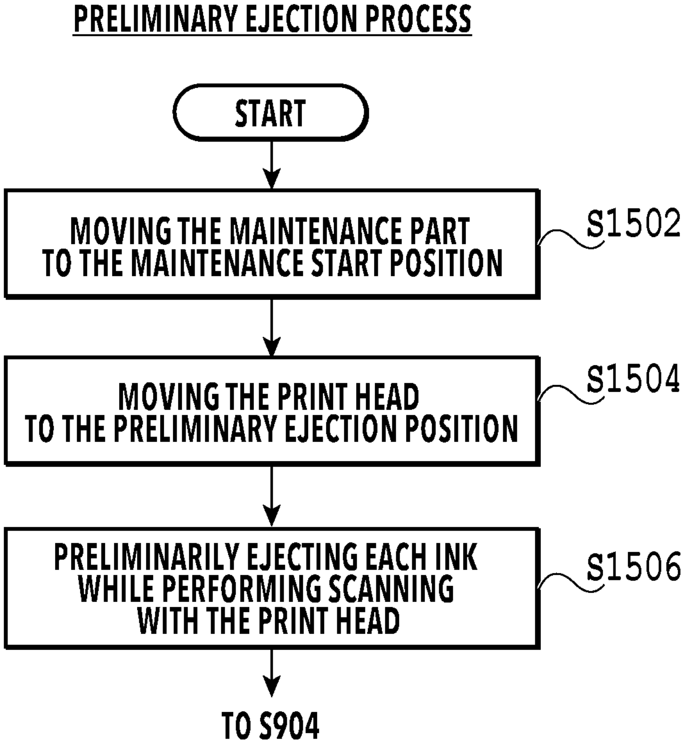
FIG. 15 is a flowchart of a preliminary ejection process of another embodiment.
Figure 16:
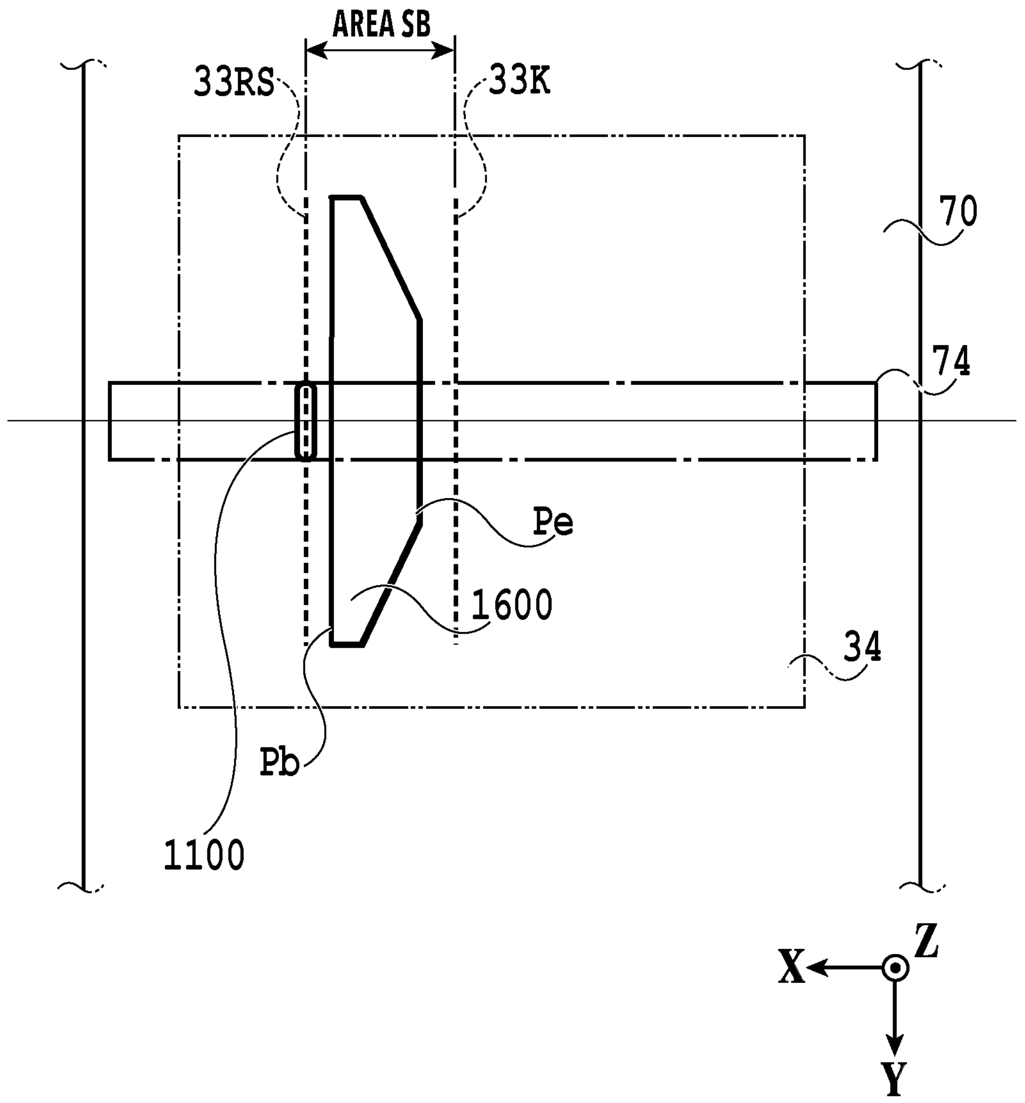
FIG. 16 is a diagram illustrating an area where the preliminary ejection is performed by the maintenance part.

Hereinafter, a mode in which ink is ejected while moving the print head 24 during the preliminary ejection process will be explained. FIG. 15 is a flowchart illustrating a detailed processing routine of the preliminary ejection process in the present embodiment. FIG. 16 is a diagram illustrating the area where the preliminary ejection is performed while moving the print head 24.

In the preliminary ejection process of the present embodiment, first, the CPU 102 moves the maintenance part 28 to the maintenance start position (S1502). The specific details of processing of S1502 are the same as those of S1002. Next, the CPU 102 moves the print head 24 to a position where ink can be ejected from the ejection port array 33Y to the preliminary ejection start position Pb, which is set in the vicinity of the area 1100 on which the ejection port array 33RS abuts (S1504). Then, while moving the print head 24 in the −X direction, the preliminary ejection is performed with the numbers of shots illustrated in FIG. 14 for the ink of each color (S1506), and the processing proceeds to the wiping process of S904. In S1506, while moving the print head 24 in the −X direction, if the print head 24 reaches the position where the ejection port array 33 corresponding to each ink can perform ejection to the preliminary ejection start position Pb, the preliminary ejection operation in which ink is ejected from the ejection ports 32 of the ejection port array 33 that has reached the position is performed. In this preliminary ejection operation, all of the inks are ejected into the area SB. For example, the print head 24 ejects ink at an ejection frequency of 6 kHz while performing scanning in the −X direction at a speed of 10 ips on a per 600 dpi basis. Then, if the ejection port array 33 reaches the position where ejection to the preliminary ejection end position Pe can be performed, ink is ejected from the predetermined ejection ports 32 of the ejection port array 33 which has reached the position, and then the preliminary ejection operation ends. In a case where the preliminary ejection is performed with the numbers of shots illustrated in FIG. 14, the preliminary ejection area 1600 where the preliminary ejection is performed with each ink is as illustrated in FIG. 16.

At the preliminary ejection start position Pb of the preliminary ejection area 1600, ink is ejected from all the ejection ports of the ejection port arrays of the respective inks, and, once the distance from the preliminary ejection start position Pb reaches about 0.8 mm, the number of ejection ports that eject ink will be gradually decreased. Then, once the distance from the preliminary ejection start position Pn reaches about 4.2 mm, ink will be ejected only from the ejection ports 32 of the ejection port No. 511 to 1023, and, at the point in time where the ejection port arrays 33 reach this position, ejection of ink from the ejection port arrays 33 will end. Note that each value shown in the present embodiment can be changed as appropriate. Further, the area where the ink is preliminarily ejected is not limited to the preliminary ejection area 1600. That is, according to the relationship between the scanning speed of the print head 24 and the number of droplets of the preliminary ejection, the preliminary ejection area can be changed depending on the number of droplets of the preliminary ejection so as to be located inside the area SB without exceeding the maximum ejection frequency.

Figure 17A:
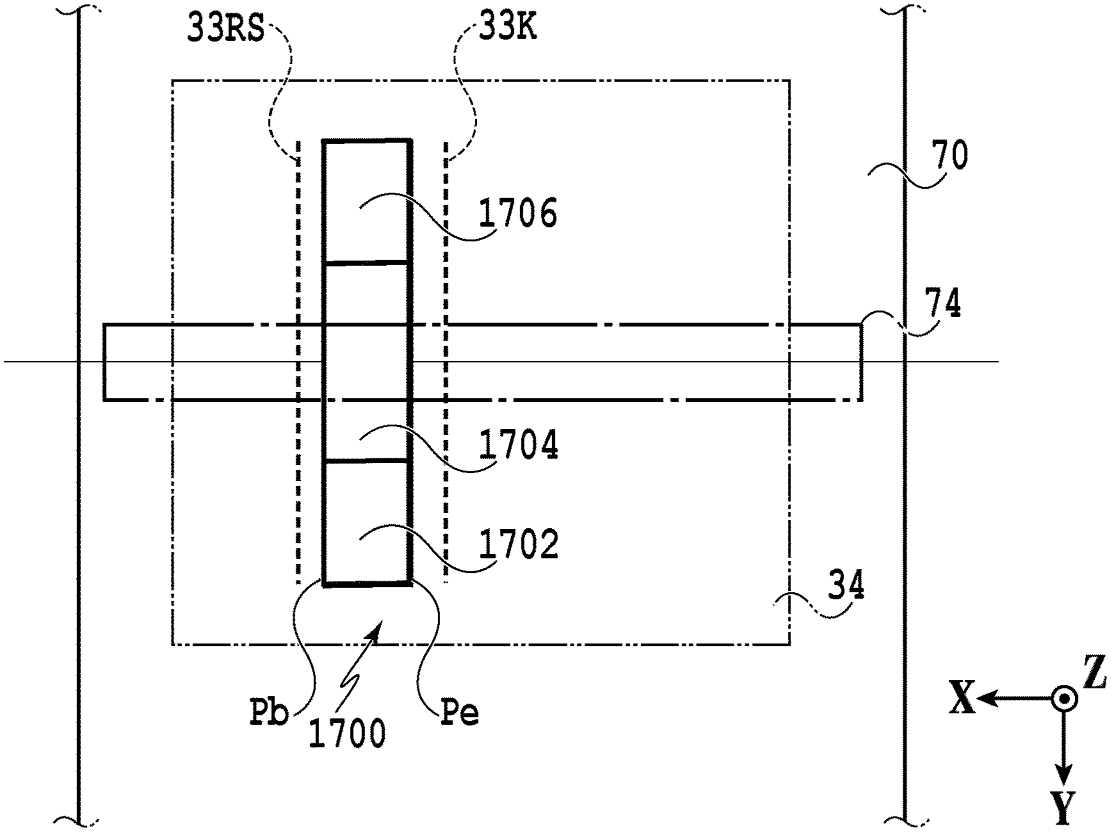
FIG. 17A and FIG. 17B are diagrams for explaining the preliminary ejection performed based on ejection duties.
Figure 17B:
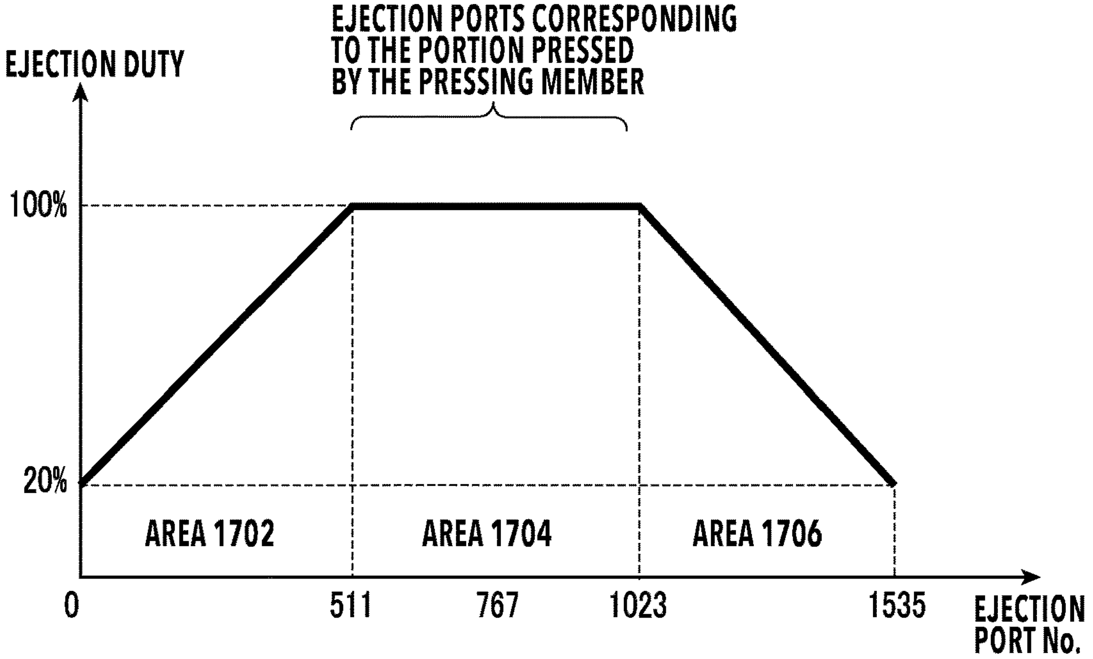

Further, in the above-described explanation, although the preliminary ejection of each ink from each ejection port 32 is controlled based on the numbers of shots illustrated in FIG. 14, there is not a limitation as such. That is, for example, as illustrated in FIG. 17A and FIG. 17B, it is also possible that the ejection duty is changed according to the positions of the ejection ports 32 of the ejection port arrays 33, so as to control the number of shots of ink from each ejection port 32 at the time of the preliminary ejection. FIG. 17A is a diagram illustrating an example of the preliminary ejection area in a case where the ejection duty is changed. FIG. 17B is a diagram illustrating the ejection duties corresponding to the ejection ports.

Specifically, as in FIG. 17B, the printing is performed with an ejection duty of 100% from the ejection port No. 511 to the ejection port No. 1023, and the ejection duty gradually decreases from the ejection port No. 511 toward the ejection port No. 0, and the ejection duty becomes 20% at the ejection port No. 0. Further, the ejection duty gradually decreases from the ejection port No. 1023 toward the ejection port No. 1535, and the ejection duty becomes 20% at the ejection port No. 1535.

If the preliminary ejection is performed based on the ejection duties corresponding to the ejection ports 32 in this way, the preliminary ejection area 1700 as illustrated in FIG. 17A is obtained. The area 1704, which is the central portion of this preliminary ejection area 1700, is the area corresponding to the ejection port No. 511 to 1023, where the printing is performed at an ejection duty of 100%. The area 1702 located on the +Y direction side of the preliminary ejection area 1700 is the area corresponding to the ejection port No. 0 to 510, and the printing is performed with the ejection duty gradually decreasing toward the ejection port No. 0, and the printing is performed with the ejection duty of 20% at the ejection port No. 0. The area 1706 located on the −Y direction side of the preliminary ejection area 1700 is the area corresponding to the ejection port No. 1024 to 1535, and the printing is performed with the ejection duty gradually decreasing toward the ejection port No. 1535, and the printing is performed with the ejection duty of 20% at the ejection port No. 1535.

As explained above, in the printing apparatus 10 according to the present embodiment, the ejection amount (the number of shots) of the ink to be preliminarily ejected is set to be the largest in the portion of the cleaning member 70 pressed by the pressing member 74 and to be decreased more at a position further away from the portion. Further, the ink is ejected while performing scanning with the print head 24 at the time of the preliminary ejection. Therefore, in the printing apparatus according to the present embodiment, in addition to the effects of the above-described first embodiment, the consumption amount of ink can be suppressed. Further, the ejection amount of ink during the preliminary ejection can be controlled with ejection duties.

Fourth Embodiment

Figure 18:
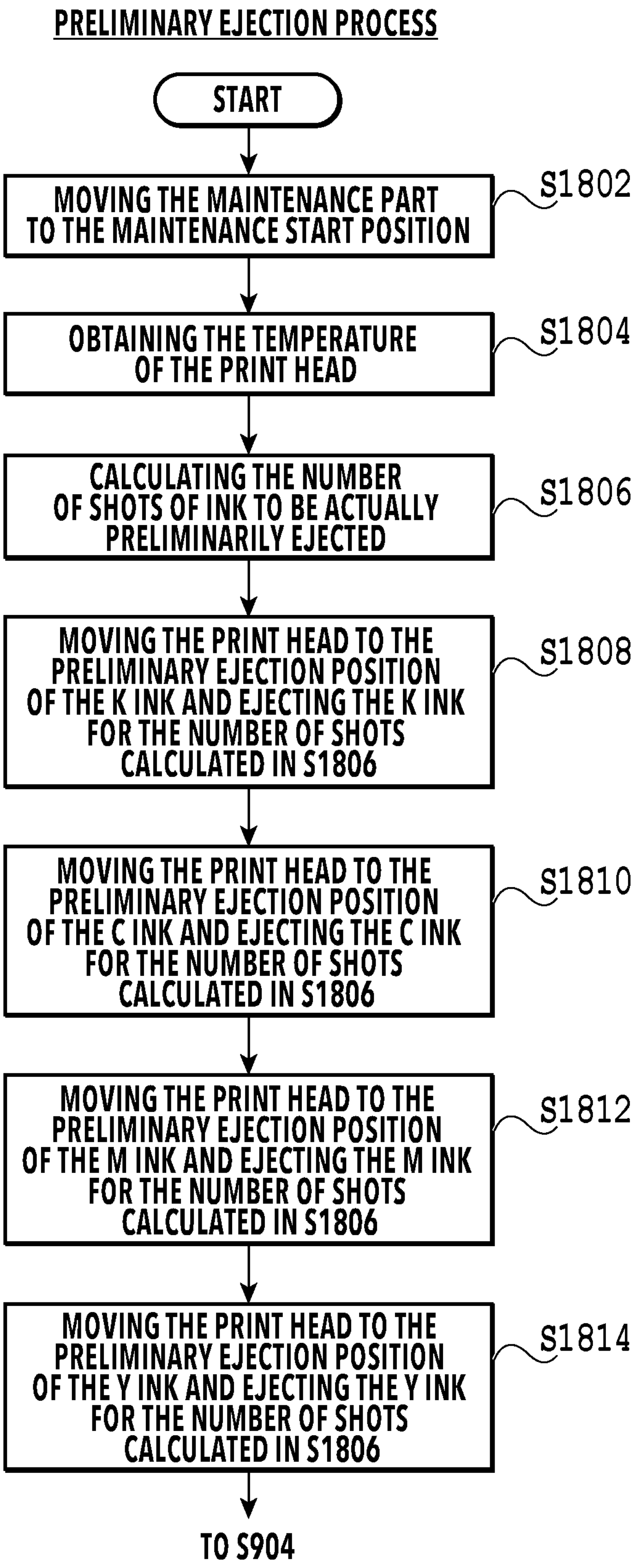
FIG. 18 is a flowchart of a preliminary ejection process of another embodiment.

Next, with reference to FIG. 18 and FIG. 19, the printing apparatus according to the fourth embodiment will be explained. Note that, in the following explanation, the same or corresponding configurations as those of the above-described first embodiment are assigned with the same reference signs as those used in the first embodiment, so as to omit the detailed explanations thereof.

The fourth embodiment is different from the above-described first embodiment in the aspect that the ink ejection amount at the time of preliminary ejection is changed according to the temperature of the print head 24.

More specifically, as the temperature of the base plate 44 becomes higher, the viscosity of the ink and reaction liquid inside the ejection ports 32 formed in the base plate 44 becomes lower. If the wiping operation is performed in a state where the viscosity of an ink or reaction liquid is low, the amount of the ink or the reaction liquid that seeps out to the cleaning member 70 increases in a case where the cleaning member 70 comes into contact with the ejection port arrays 33. If the amount of the reaction liquid RS seeping out to the cleaning member 70 increases, it is necessary to increase the amount of ink to be ejected at the time of the preliminary ejection in order to regulate the spread of the reaction liquid RS in the cleaning member 70.

Therefore, in the present embodiment, the temperature of the print head 24 is detected by the temperature sensors 46 which are installed in the vicinity of both ends of the ejection port array 33RS in the Y direction, and, as the detected temperature is higher, the ejection amount of ink at the time of the preliminary ejection is increased. Accordingly, it becomes possible to cope with the amount of the reaction liquid RS that seeps out to the cleaning member 70, which changes according to the temperature of the print head 24, and becomes possible to more reliably suppress the occurrence of ejection failure due to the reaction of an ink and the reaction liquid RS.

Hereinafter, a mode in which the ejection amount of ink at the time of the preliminary ejection is changed according to the temperature of the print head 24 will be explained. FIG. 18 is a flowchart illustrating a detailed processing routine of the preliminary ejection process in the present embodiment. FIG. 19 is a table illustrating the coefficients for multiplying the number of shots of ink at the time of preliminary ejection, which are associated with the temperatures of the print head 24.

In the preliminary ejection process of the present embodiment, first, the CPU 102 moves the maintenance part 28 to the maintenance start position (S1802). The specific details of processing of S1802 are the same as those of S1002. Next, the CPU 102 obtains the temperature of the print head 24 (S1804). In S1804, in order to detect a temperature approximate to the temperature of the reaction liquid RS inside the ejection ports 32, the CPU 102 obtains the temperature of the print head 24, based on signals that are output from the temperature sensors 46 which are installed on the base plate 44RS of the print head 24.

Further, based on the obtained temperature, the number of shots of the ink to be preliminarily ejected is calculated (S1806). That is, in S1806, for the K ink, the C ink, the M ink, and the Y ink, the number of shots of ink to be ejected from the respective ejection ports 32 of the ejection port arrays 33 at the time of actual preliminary ejection is calculated. Note that the calculated value is saved in the RAM 106.

In S1806, the coefficient is obtained based on the table (see FIG. 19) stored in the ROM 104. Then, by multiplying the number of shots of ink to be preliminarily ejected which is set for the ejection ports 32 by the obtained coefficient in order to correct the number of shots of ink, the number of shots of ink to be actually ejected at the time of preliminary ejection is calculated. For example, if the temperature of the print head 24 is 32° C., the coefficient is "1.1" according to the table illustrated in FIG. 19. Therefore, for the ejection port No. 511, which is set so as to eject 100 shots, the number of shots of ink to be actually ejected at the time of preliminary ejection is calculated to be 110 shots (1.1×100). Further, for the ejection port No. 0, which is set so as to eject 20 shots, the number of shots of ink to be actually ejected at the time of preliminary ejection is calculated to be 22 shots (1.1×20). Note that the relationship between the temperatures and the coefficients illustrated in FIG. 19 is merely an example and may be appropriately changed depending on the type of the reaction liquid RS to be used, the type of the cleaning member 70, etc.

As the temperature of the reaction liquid is higher, the amount of the reaction liquid that seeps out from the cleaning member 70 increases. Therefore, the coefficients to obtain the number of shots of ink that can regulate the reaction liquid that seeps out to the cleaning member 70 so as not to spread to the area 1100 (or its vicinity), which is abutted by the ejection port array 33K, are set in the table of FIG. 19 according to the temperature of the print head 24.

Thereafter, the CPU 102 moves the print head 24 to the preliminary ejection position for preliminarily ejecting the K ink, and, at the preliminary ejection position, the K ink is ejected from each ejection port 32 of the ejection port array 33K by the number of shots calculated in S1806 (S1808). Further, the CPU 102 moves the print head 24 to the preliminary ejection position for preliminarily ejecting the C ink, and, at the preliminary ejection position, the C ink is ejected from each ejection port 32 of the ejection port array 33C by the number of shots calculated in S1806 (S1810). Moreover, the CPU 102 moves the print head 24 to the preliminary ejection position for preliminarily ejecting the M ink, and, at the preliminary ejection position, the M ink is ejected from each ejection port 32 of the ejection port array 33M by the number of shots calculated in S1806 (S1812). Furthermore, the CPU 102 moves the print head 24 to the preliminary ejection position for preliminarily ejecting the Y ink, and, at the preliminary ejection position, the Y ink is ejected from each ejection port 32 of the ejection port array 33Y by the number of shots calculated in S1806 (S1814), and the processing proceeds to the wiping process of S904. Such a preliminary ejection operation is performed at a frequency that does not exceed the maximum ejection frequency of the print head 24 used in the printing apparatus 10.

Although the above-described embodiment has a configuration in which the temperature sensors 46 are installed on each base plate 44, the temperature of the print head 24 is detected by the temperature sensors 46 of the base plate 44 RS, and the number of shots of ink at the time of preliminary ejection is corrected based on this detection result, there is not a limitation as such. That is, it is also possible that the coefficient for correcting the number of ink shots is determined based on the detection result of the temperature sensors 46 installed on each base plate 44. Further, although the temperature sensors 46 are installed at both ends of the ejection port arrays 33 in the Y direction on the respective base plates 44, there is not a limitation as such. That is, the temperature sensor 46 may be installed on at least only one end of the ejection port arrays 33 in the Y direction.

As explained above, in the printing apparatus 10 according to the present embodiment, as the temperature of the print head 24 is higher at the time of executing the preliminary ejection process explained in the above-described first embodiment, the ejection amount of the ink to be preliminarily ejected is increased. As a result, if the amount of the reaction liquid RS seeping out to the cleaning member 70 during the wiping operation is large, the preliminary ejection can be performed with an amount of ink corresponding to the reaction liquid that seeped out. Accordingly, the reaction liquid RS that seeped out to the cleaning member 70 is regulated by the preliminarily ejected ink so as not to spread to the area 1102. Therefore, it becomes possible to more reliably suppress ejection failure which is caused by the reaction of the ink and the reaction liquid RS.

Fifth Embodiment

Figure 20:
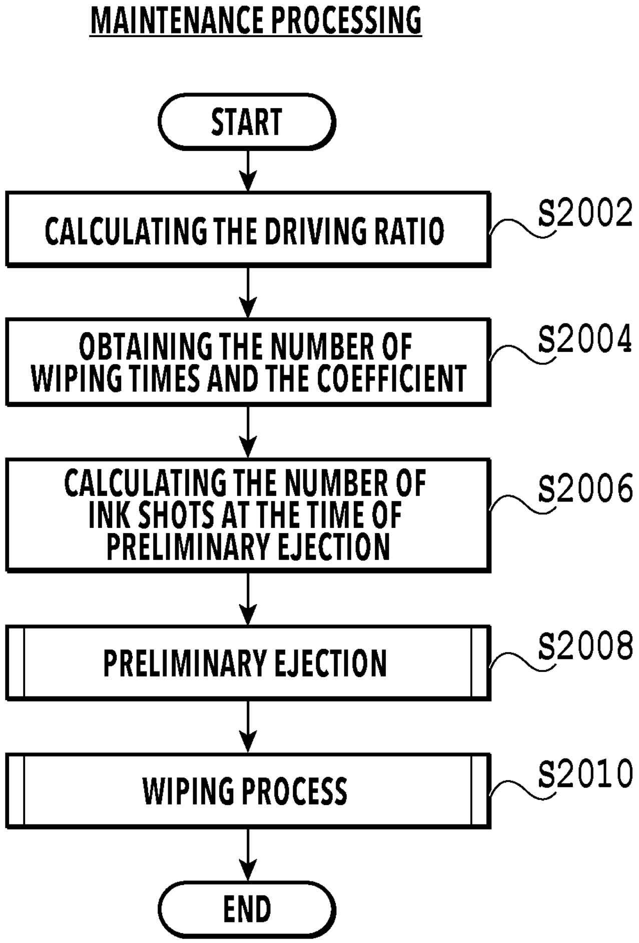
FIG. 20 is a flowchart of maintenance processing of another embodiment.
Figure 21:
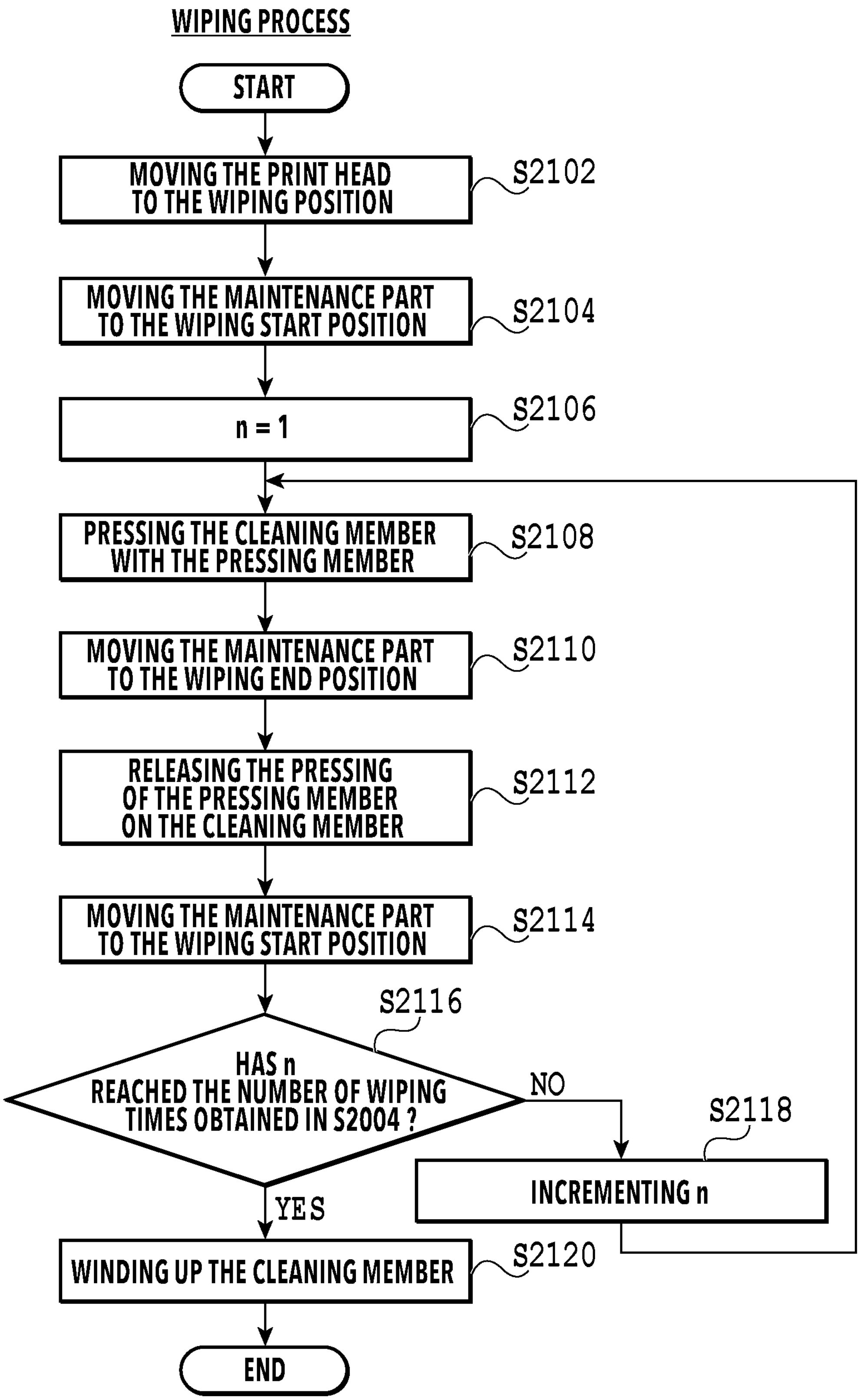
FIG. 21 is a flowchart of the wiping process, which is a subroutine of the maintenance processing of FIG. 20.

Next, with reference to FIG. 20 through FIG. 22, the printing apparatus according to the fifth embodiment will be explained. Note that, in the following explanation, the same or corresponding configurations as those of the above-described first embodiment are assigned with the same reference signs as those used in the first embodiment, so as to omit the detailed explanations thereof.

The fifth embodiment is different from the above-described first embodiment in the aspect that the driving ratio is calculated based on the number of droplets of ink in the printing operation executed after the previous maintenance processing, and the number of wiping times and the ejection amount of ink to be preliminarily ejected are changed based on the driving ratio.

Although the maintenance processing is executed every time the print head 24 performs the printing operations for ten round trips in the above-described first embodiment, the time required for the print processing becomes longer if the maintenance processing is frequently executed during the print processing. Therefore, from the viewpoint of efficiency, etc., it is preferable that the number of maintenance processing executed during the print processing is less. For example, by performing the maintenance processing every time the printing operations are performed for 20 round trips, the time required for printing can be shortened, and efficient printing can be performed. However, in this case, the printing operations have been executed for the twice number of times since the previous maintenance processing, so that there is a risk that more deposits such as ink are attached to the ejection port surface 34.

Therefore, in the present embodiment, the driving ratio of ink in the printing operation executed during the maintenance processing is calculated, and the number of wiping times and the ejection amount of the ink to be preliminarily ejected are changed based on this driving ratio, so as to cope with the deposits adhering to the ejection port surface 34. Note that, in the present embodiment, the driving ratio is the ratio of the ejection amount of ink at the time of actually ejecting ink for printing based on print data to the maximum ejection amount of ink that can be ejected at the time of printing.

Hereinafter, a mode in which the number of wiping times and the ejection amount of ink to be preliminarily ejected are changed according to the driving ratio of ink during the maintenance processing will be explained. FIG. 20 is a flowchart illustrating a detailed processing routine of the maintenance processing in the present embodiment. FIG. 21 is a flowchart illustrating a detailed processing routine of the wiping process, which is a subroutine of FIG. 20. FIG. 22 is a table illustrating the number of wiping times and a coefficient for multiplying the number of shots of ink at the time of preliminary ejection, which are associated with a driving ratio.

In the printing apparatus 10 according to the present embodiment, the CPU 102 is configured to count the total number of ink ejection for every 20 round trips of printing operations from the start of printing. It is also possible that the control part 100 is equipped with a counter (not illustrated in the drawings) for performing the counting.

In the maintenance processing of the present embodiment, first, the CPU 102 uses the counted value of the total number of ink ejection for every 20 round trips of printing operations and the maximum number of ink ejection that can be performed in the 20 round trips of printing operations, in order to calculate the driving ratio D (S2002). The maximum number of ink ejection that can be performed in 20 round trips of printing operations is the maximum value of the number of ink ejection that can be performed from the ejection ports 32 of the ejection port arrays 33K, 33C, 33M, and 33Y in the printing operations performed for 20 round trips. In S2002, the driving ratio D is obtained by dividing the counted value by the maximum number of ejection.

Next, the CPU 102 obtains the number of wiping times, which is the number of times of wiping operations during the wiping process, and the coefficient for multiplying the number of shots of ink to be preliminarily ejected, based on the calculated driving ratio D (S2004). In S2004, the number of wiping times and the coefficient are obtained based on the calculated driving ratio D and the table illustrated in FIG. 22. In the table of FIG. 22, the numbers of wiping times and the coefficients are associated with the driving ratios D. In this table, as compared with a case in which the driving ratio D is low, in a case where the driving ratio D is high, the number of wiping times is large and the coefficient for multiplying the number of ink shots at the time of preliminary ejection is large, that is, the ejection amount of ink at the time of preliminary ejection is large.

Note that the driving ratios, the numbers of wiping times, and the coefficients illustrated in FIG. 22 are merely examples and can be appropriately changed depending on the inks to be used, the type of reaction liquid, the type of cleaning member 70, etc. Further, although the numbers of wiping times and the coefficients for multiplying the number of droplets of ink at the time of preliminary ejection are associated with the driving ratios D in FIG. 22, there is not a limitation as such. That is, it is also possible that an element that makes a difference on the effect of regulating the diffusion of the reaction liquid if changed, such as the type of ink that is highly effective on regulating the diffusion of the reaction liquid that seeps out, is associated with the driving ratios D. Further, it is also possible that an element that makes a difference on the effect of wiping if the value thereof is changed, such as the movement speed of the maintenance part 28 and the pressing force by the pressing member 74, is associated with the driving ratios. In these cases, the preliminary ejection process and wiping process that follow will be executed according to the values and types of the elements associated with the driving ratios D. Further, although the driving ratio D is divided into two stages so that the number of wiping times or the like is associated with each stage, there is not a limitation as such, and it is also possible that the driving ratio D is divided into three or more stages.

Thereafter, the number of ink shots at the time of preliminary ejection is calculated based on the obtained coefficient (S2006), and the preliminary ejection process is executed based on the calculated number of ink shots (S2008). The specific details of processing of the preliminary ejection process are the same as those of the preliminary ejection process of FIG. 10, except that each ink is ejected for the number of ink shots calculated in S2006. That is, the print head 24 is moved to the preliminary ejection position of the K ink in S1004, and, based on the number of ink shots calculated in S2006, the K ink is ejected from each ejection port 32 of the ejection port array 33K in the preliminary ejection process of S2008. Further, the print head 24 is moved to the preliminary ejection position of the C ink in S1006, and, based on the number of ink shots calculated in S2006, the C ink is ejected from each ejection port 32 of the ejection port array 33C. Moreover, the print head 24 is moved to the preliminary ejection position of the M ink in S1008, and, based on the number of ink shots calculated in S2006, the M ink is ejected from each ejection port 32 of the ejection port array 33M. Furthermore, the print head 24 is moved to the preliminary ejection position of the Y ink in S1010, and, based on the number of ink shots calculated in S2006, the Y ink is ejected from each ejection port 32 of the ejection port array 33Y.

If the preliminary ejection process ends, the wiping process is performed next (S2010). The wiping process of S2010 will be explained with reference to FIG. 21. In the wiping process of S2010, first, the CPU 102 moves the print head 24 to the wiping position (S2102). Further, the CPU 102 moves the maintenance part 28 to the wiping start position (S2104). Note that the specific details of processing of S2102 and S2104 are the same as those of S1202 and S1204 described above.

Next, the CPU 102 sets the variable "n" representing the number of wiping times to "1" (S2106). Then, the CPU 102 causes the pressing member 74 to be in a state of pressing the cleaning member 70 (S2108) and, while maintaining that state, causes the maintenance part 28 to move in the +Y direction to the wiping end position (S2110). If the maintenance part 28 is moved to the wiping end position, the CPU 102 then releases the pressing of the pressing member 74 on the cleaning member 70 at the wiping end position (S2112). Then, the CPU 102 moves the maintenance part 28 to the wiping start position (S2114). Note that the specific details of processing of S2108 to S2114 are the same as those of S1206 to S1212 described above.

Thereafter, the CPU 102 determines whether or not the variable n has reached the number of wiping times obtained in S2004 (S2116). If it is determined in S2116 that the variable n has not reached the number of wiping times obtained in S2004, n is incremented (S2118), so that the processing returns to S2108, and the subsequent processes will be executed. Further, if it is determined in S2116 that the variable n has reached the number of wiping times obtained in S2004, the CPU 102 drives the rotary member **72*b* to wind up the cleaning member 70 (S2120) and ends this wiping process, so that the maintenance processing will thereby be ended. Note that the specific details of processing of S2118 are the same as those of S1214** described above.

Note that, although the maintenance processing is executed every time the printing operations are executed for 20 round trips in the above-described explanation, the timing of executing the maintenance processing is not limited as such. That is, such a timing may be appropriately changed according to the configuration of the print head 24, etc. Further, it is also possible that the maintenance processing is executed every time the printing operations are executed for 10 round trips. In this case, the number of wiping times and the coefficient can be changed according to the driving ratio, so that it is possible to perform maintenance according to the situation of ejection amount of ink at the time of the printing operation.

As explained above, in the printing apparatus 10 according to the present embodiment, the driving ratio in the printing operation after the previous maintenance processing is calculated, and, based on this driving ratio, the coefficient for multiplying the number of ink shots at the time of preliminary ejection and the number of wiping times are obtained. Here, if the driving ratio is high, the coefficient is large, so that the ejection amount of ink at the time of preliminary ejection becomes larger and the number of wiping times becomes larger, as compared with a case where the driving ratio is low.

Accordingly, it is possible to reduce the frequency of the maintenance processing while maintaining the effect of the maintenance processing, which can contribute to shortening of the printing time. Further, the degrees of the preliminary ejection process and the wiping process in the maintenance processing change depending on the degree of soiling on the ejection port surface 34, which is based on the driving ratio, and thus the maintenance processing can be executed efficiently.

OTHER EMBODIMENTS

Note that the above-described embodiments may be modified as shown in the following (1) through (5).

(1) Although the above-described embodiments have a configuration in which the K ink, C ink, M ink, and Y ink that include pigments as color materials are preliminarily ejected, the inks to be preliminarily ejected are not limited as such. Specifically, as long as the liquid contains a solid content and reacts with the reaction liquid RS, it is also possible to eject an ink containing no pigment (for example, clear ink) to the area SB. Further, the inks containing pigments are also not limited to the K ink, C ink, M ink, and Y ink, and the number of these inks is also not limited to four colors.

(2) Although the above-described embodiments have a configuration in which the print head 24 moves in the X direction and the maintenance part 28 moves in the Y direction in the printing apparatus 10, there is not a limitation as such. That is, it is also possible that one of the print head 24 and the maintenance part 28 is fixedly arranged and the other one moves in the X direction and the Y direction, and it is sufficient as long as the print head 24 and the maintenance part 28 are configured to be capable of moving in a relative manner.

(3) Although ink is ejected while moving the print head 24 in the X direction at the time of preliminary ejection in the above-described second embodiment and third embodiment, there is not a limitation as such. Specifically, it is also possible that the maintenance part 28 is configured to be movable also in the X direction, so that the preliminary ejection is performed while moving the maintenance part 28 in the X direction without moving the print head 24.

(4) Although the ejection amount of ink at the time of preliminary ejection is the same for each ink in the above-described embodiments, there is not a limitation as such. That is, it is also possible to eject more ink at the time of preliminary ejection for inks having high reactivity with the reaction liquid RS.

(5) The above-described embodiments and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-050257, filed Mar. 24, 2021, which is hereby incorporated by reference wherein in its entirety.

What is claimed is:

1. A printing apparatus comprising:

a printing unit in which a first ejection port array provided along a predetermined direction for ejecting ink, and a second ejection port array provided along the predetermined direction ejecting reaction liquid that reacts with the ink, are formed side by side in a direction intersecting the predetermined direction on the same plane;

a maintenance unit configured to be capable of receiving the ink and the reaction liquid that are ejected from the printing unit and capable of wiping an ejection port surface of the printing unit on which the first ejection port array and the second ejection port array are formed; and a control unit configured to control at least one of the printing unit and the maintenance unit so that the ejection port surface is wiped by the maintenance unit along the predetermined direction by moving at least one of the printing unit and the maintenance unit in a relative manner, wherein the control unit is further configured such that, before the wiping is performed, the control unit executes preliminary ejection by the first ejection port array in which ink is ejected to an area of the maintenance unit between an area abutted by the first ejection port array during the wiping and an area abutted by the second ejection port array during the wiping and in which ink is not ejected to the area abutted by the first ejection port array during the wiping or the area abutted by the second ejection port array during the wiping.

2. The printing apparatus according to claim 1, wherein the maintenance unit wipes the first ejection port array and the second ejection port array at the same time while applying pressure to the ejection port surface, and wherein, at the time of executing the preliminary ejection, the control unit increases an ink ejection amount to a largest amount at a position corresponding to an area of the maintenance unit that applies pressure to the ejection port surface at the time of wiping.

3. The printing apparatus according to claim 1, wherein the control unit performs the preliminary ejection in a state where the printing unit and the maintenance unit are stopped.

4. The printing apparatus according to claim 1, wherein the control unit performs the preliminary ejection while moving at least one of the printing unit and the maintenance unit in a relative manner.

5. The printing apparatus according to claim 1, wherein the control unit preforms the preliminary ejection based on a number set in advance which designates shots of ink in preliminary ejection for each ink ejection port configuring the first ejection port array.

6. The printing apparatus according to claim 1, wherein the control unit preforms the preliminary ejection based on an ejection duty that is set in advance for each ink ejection port configuring the first ejection port array.

7. The printing apparatus according to claim 1 further comprising a detection unit configured to be capable of detecting a temperature of the printing unit, wherein the control unit changes an ink ejection amount for the preliminary ejection, based on a detection result of the detection unit.

8. The printing apparatus according to claim 7, wherein the detection unit is installed on at least one end side of the second ejection port array in the predetermined direction.

9. The printing apparatus according to claim 1, wherein the control unit determines an ink ejection amount and a number of wiping times for the preliminary ejection, based on a ratio of an ink ejection amount ejected in printing after the previous wiping to a maximum ink ejection amount that can be ejected from the first ejection port array in the printing.

10. The printing apparatus according to claim 9, wherein the control unit increases the number of wiping times with an increase in the ratio.

11. The printing apparatus according to claim 9, wherein the control unit increases the ink ejection amount for the preliminary ejection with an increase in the number of wiping times.

12. The printing apparatus according to claim 1, wherein the maintenance unit includes a sheet web or a pad-like non-woven fabric, which is made with fibers that are bonded or entangled by melt-adhesion or mechanical or chemical action, and receives the ink ejected from the printing unit and wipes the ejection port surface with the non-woven fabric.

13. The printing apparatus according to claim 1, wherein the ink ejected from the first ejection port array is ink containing a solid content, and wherein the reaction liquid ejected from the second ejection port array is liquid containing a reactive component that reacts with the solid content to aggregate or gel the solid content.

14. A maintenance method of a printing apparatus in which the printing apparatus includes:

a printing unit in which a first ejection port array provided along a predetermined direction for ejecting ink, and a second ejection port array provided along the predetermined direction for ejecting reaction liquid that reacts with the ink, are formed side by side in a direction intersecting the predetermined direction on the same plane; and a maintenance unit configured to be capable of receiving the ink and the reaction liquid that are ejected from the printing unit and capable of wiping an ejection port surface of the printing unit on which the first ejection port array and the second ejection port array are formed, wherein the maintenance method comprises:

a step for executing preliminary ejection by the first ejection port array, in which ink is ejected to an area of the maintenance unit between an area abutted by the first ejection port array during the wiping and an area abutted by the second ejection port array during the wiping and in which ink is not ejected to the area abutted by the first ejection port array during the wiping or the area abutted by the second ejection port array during the wiping, before the wiping is performed by the maintenance unit; and a step for wiping the ejection port surface along the predetermined direction with the maintenance unit by moving at least one of the printing unit and the maintenance unit in a relative manner.

* * * * *